United States Patent
Macmillan et al.

(10) Patent No.: US 9,832,397 B2
(45) Date of Patent: *Nov. 28, 2017

(54) IMAGE TAPING IN A MULTI-CAMERA ARRAY

(71) Applicant: GoPro, Inc., San Mateo, CA (US)

(72) Inventors: Timothy Macmillan, LaHonda, CA (US); Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,159

(22) Filed: Sep. 12, 2016

(65) Prior Publication Data

US 2017/0013209 A1    Jan. 12, 2017

Related U.S. Application Data

(63) Continuation of application No. 14/991,481, filed on Jan. 8, 2016, now Pat. No. 9,473,713, which is a
(Continued)

(51) Int. Cl.
*H04N 5/225* (2006.01)
*H04N 5/262* (2006.01)
(Continued)

(52) U.S. Cl.
CPC ......... *H04N 5/3415* (2013.01); *G06T 3/0068* (2013.01); *G06T 3/0093* (2013.01);
(Continued)

(58) Field of Classification Search
CPC ............ H04N 5/3415; H04N 5/23229; H04N 5/2258; G06T 3/0093; G06T 5/006
See application file for complete search history.

(56) References Cited

U.S. PATENT DOCUMENTS 4,191,462 A    3/1980   Johnson
5,602,584 A    2/1997   Mitsutake et al.
(Continued)

FOREIGN PATENT DOCUMENTS

WO    WO 2012/061571 A1    5/2012

OTHER PUBLICATIONS

PCT Invitation to Pay Additional Fees and, Where Applicable, Protest Fee for PCT/US15/16719, dated May 8, 2015, 2 pages.
(Continued)

*Primary Examiner* — Daniel M Pasiewicz
(74) *Attorney, Agent, or Firm* — Fenwick & West LLP

(57) ABSTRACT

Multiple cameras are arranged in an array at a pitch, roll, and yaw that allow the cameras to have adjacent fields of view such that each camera is pointed inward relative to the array. The read window of an image sensor of each camera in a multi-camera array can be adjusted to minimize the overlap between adjacent fields of view, to maximize the correlation within the overlapping portions of the fields of view, and to correct for manufacturing and assembly tolerances. Images from cameras in a multi-camera array with adjacent fields of view can be manipulated using low-power warping and cropping techniques, and can be taped together to form a final image.

20 Claims, 19 Drawing Sheets

Related U.S. Application Data continuation of application No. 14/308,507, filed on Jun. 18, 2014, now Pat. No. 9,262,801.

(60) Provisional application No. 61/973,788, filed on Apr. 1, 2014, provisional application No. 61/979,386, filed on Apr. 14, 2014, provisional application No. 61/985,256, filed on Apr. 28, 2014.

(51) Int. Cl.

| | | |
|---|---|---|
| *H04N 5/341* | (2011.01) | |
| *H04N 5/232* | (2006.01) | |
| *H04N 5/247* | (2006.01) | |
| *G06T 3/00* | (2006.01) | |
| *G06T 3/40* | (2006.01) | |
| *G06T 5/00* | (2006.01) | |
| *G06T 5/50* | (2006.01) | |
| *G06T 7/33* | (2017.01) | |

(52) U.S. Cl.
CPC ............ *G06T 3/4038* (2013.01); *G06T 5/006* (2013.01); *G06T 5/50* (2013.01); *G06T 7/344* (2017.01); *H04N 5/2252* (2013.01); *H04N 5/2253* (2013.01); *H04N 5/2257* (2013.01); *H04N 5/2258* (2013.01); *H04N 5/23216* (2013.01); *H04N 5/23229* (2013.01); *H04N 5/23232* (2013.01); *H04N 5/23238* (2013.01); *H04N 5/247* (2013.01); *H04N 5/2624* (2013.01); *H04N 5/2628* (2013.01); *G06T 2207/10004* (2013.01); *G06T 2207/20128* (2013.01); *G06T 2207/20221* (2013.01); *G06T 2210/22* (2013.01)

(56) References Cited

U.S. PATENT DOCUMENTS

| | | | |
|---|---|---|---|
| 5,668,595 | A | 9/1997 | Katayama et al. |
| 6,778,207 | B1 | 8/2004 | Lee et al. |
| 8,004,558 | B2 | 8/2011 | Prechtl et al. |
| 8,013,899 | B2 | 9/2011 | Gillard et al. |
| 8,488,257 | B2 | 7/2013 | Stark |
| 8,953,057 | B2 | 2/2015 | Kajita et al. |
| 9,196,039 | B2 | 11/2015 | MacMillan et al. |
| 9,262,801 | B2 | 2/2016 | MacMillan et al. |
| 9,473,713 | B2 * | 10/2016 | MacMillan ........... G06T 3/0068 |
| 2002/0122113 | A1 | 9/2002 | Foote |
| 2003/0133019 | A1 | 7/2003 | Hugurashi et al. |
| 2006/0013473 | A1 | 1/2006 | Woodfill et al. |
| 2006/0139475 | A1 | 6/2006 | Esch et al. |
| 2006/0181610 | A1 | 8/2006 | Carlsson et al. |
| 2007/0146530 | A1 | 6/2007 | Nose |
| 2008/0012879 | A1 | 1/2008 | Clodfelter |
| 2008/0131113 | A1 | 6/2008 | Chang |
| 2009/0290033 | A1 | 11/2009 | Jones et al. |
| 2009/0322883 | A1 | 12/2009 | Peters et al. |
| 2010/0097444 | A1 | 4/2010 | Lablans |
| 2010/0119172 | A1 | 5/2010 | Yu et al. |
| 2010/0225764 | A1 | 9/2010 | Nizko et al. |
| 2010/0231691 | A1 | 9/2010 | Lee |
| 2010/0245548 | A1 | 9/2010 | Sasaki et al. |
| 2010/0318467 | A1 | 12/2010 | Porter et al. |
| 2011/0211106 | A1 | 9/2011 | Marks et al. |
| 2011/0222757 | A1 | 9/2011 | Yeatman et al. |
| 2011/0234807 | A1 | 9/2011 | Jones et al. |
| 2012/0038753 | A1 | 2/2012 | Hoshino |
| 2012/0075427 | A1 | 3/2012 | Yahav et al. |
| 2012/0098925 | A1 | 4/2012 | Dasher et al. |
| 2012/0105574 | A1 | 5/2012 | Baker et al. |
| 2012/0194652 | A1 | 8/2012 | Myokan et al. |
| 2012/0262607 | A1 | 10/2012 | Shimura et al. |
| 2013/0010144 | A1 | 1/2013 | Park |
| 2013/0076900 | A1 | 3/2013 | Mrozek et al. |
| 2013/0147948 | A1 | 6/2013 | Higuchi et al. |
| 2013/0221226 | A1 | 8/2013 | Koren et al. |
| 2013/0229529 | A1 | 9/2013 | Lablans |
| 2014/0111606 | A1 | 4/2014 | Cossairt et al. |
| 2014/0125819 | A1 | 5/2014 | Tokunaga et al. |
| 2014/0168378 | A1 | 6/2014 | Hall |
| 2015/0181199 | A1 | 6/2015 | Yu et al. |
| 2015/0278988 | A1 | 10/2015 | MacMillan et al. |

OTHER PUBLICATIONS

Wilt, A., "HPA Tech Retreat 2010—Day 4", 2010, 10 pages, [Online], [Retrieved Mar. 11, 2014], Retrieved from the Internet, http://provideocoalition.com/awilt/story/hpatr2010_4/P1/>.

* cited by examiner

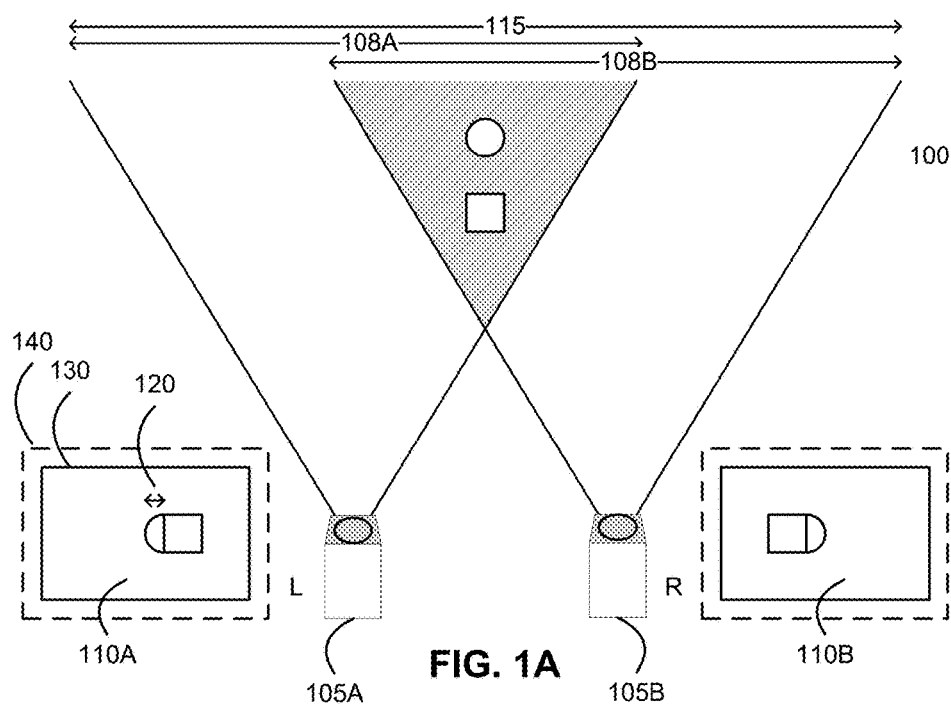
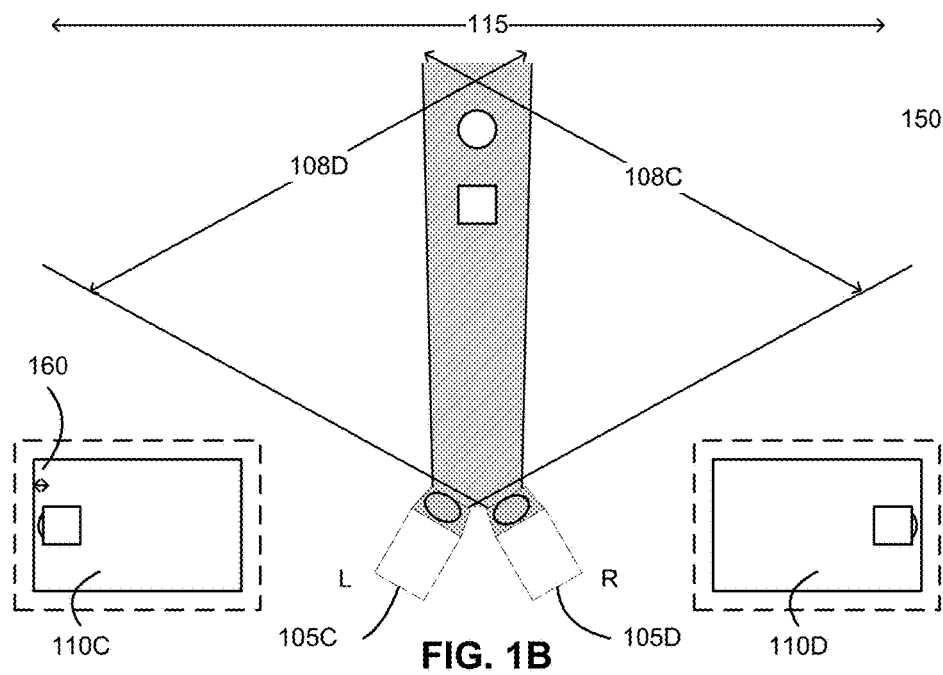

There is no distance between optical centers because the same lens is used for both lens modules

IMAGE TAPING IN A MULTI-CAMERA ARRAY

CROSS REFERENCE TO RELATED APPLICATION

This application is a continuation of U.S. application Ser. No. 14/991,481, filed Jan. 8, 2016, now U.S. Pat. No. 9,473,713, which is a continuation of U.S. application Ser. No. 14/308,507, filed Jun. 18, 2014, now U.S. Pat. No. 9,262,801, which application claims the benefit of U.S. Provisional Application No. 61/973,788, filed Apr. 1, 2014, U.S. Provisional Application No. 61/979,386, filed Apr. 14, 2014, and U.S. Provisional Application No. 61/985,256, filed Apr. 28, 2014, all of which are incorporated by reference herein in their entirety.

BACKGROUND

Technical Field

This disclosure relates to a camera array and, more specifically, to methods for capturing images using the camera array.

Description of the Related Art

Digital cameras are increasingly used in outdoors and sports environments. Using a camera to capture outdoors and sports environments, however, can be difficult if the camera is bulky or cannot capture the field of view desired. A user's experience with a camera can be diminished by camera bulkiness and limited camera functionality.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 1A illustrates a conventional multiple camera system, according to one embodiment.

FIG. 1B illustrates a 2×1 camera array arranged according to one embodiment of the configurations described herein.

DETAILED DESCRIPTION

Figure 2:
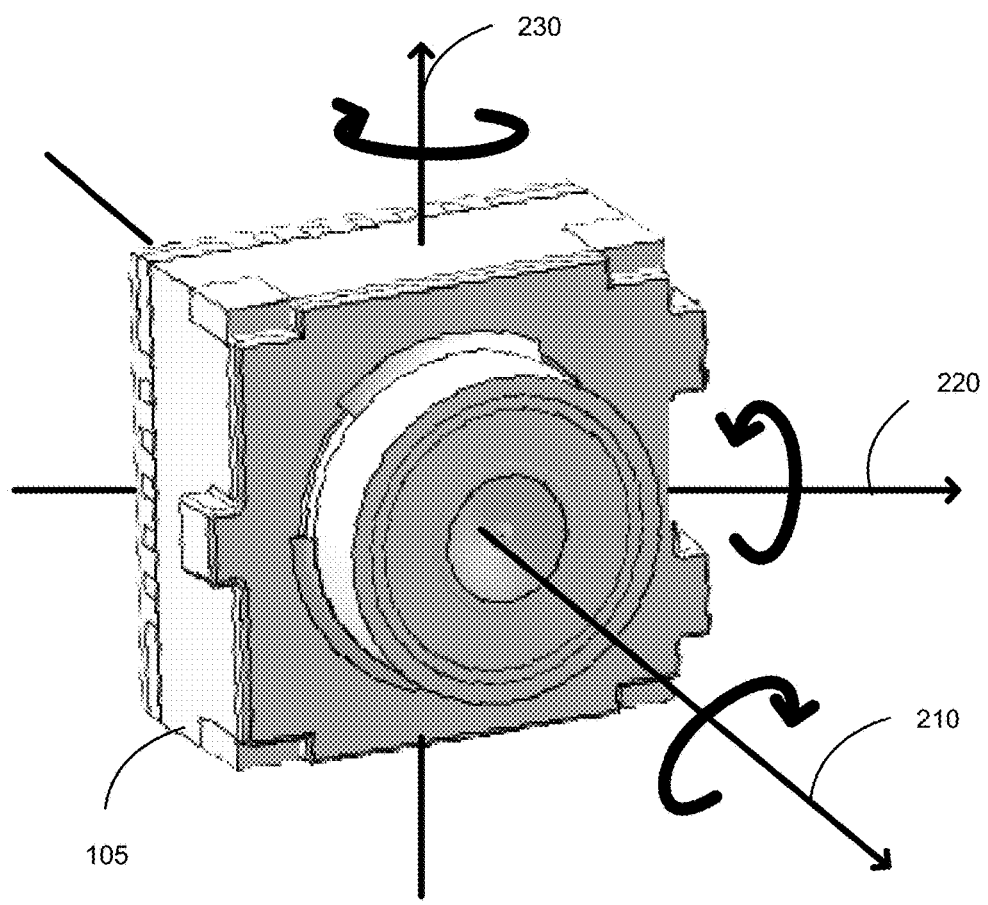
FIG. 2 illustrates roll, pitch, and yaw rotations of a camera in a camera array, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example 2×1 and 2×2 Camera Array Configuration

A camera array configuration includes a plurality of cameras, each camera having a distinctive field of view. For example, the camera array can include a 2×1 camera array, a 2×2 camera array, or any other suitable arrangement of cameras. Each camera can have a camera housing structured to at least partially enclose the camera. Alternatively, the camera array can include a camera housing structured to enclose the plurality of cameras. Each camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. In another embodiment, the camera array includes some or all of the various indicators, various input mechanisms, and electronics and includes the plurality of cameras. A camera housing can include a lens window structured on the front surface of the camera housing and configured to substantially align with the camera lenses of the plurality of cameras, and one or more indicator windows structured on the front surface of the camera housing and configured to substantially align with the camera indicators.

FIG. 1A illustrates a conventional multiple camera environment 100, according to one embodiment. In the embodiment, the conventional camera environment 100 includes two cameras 105A and 105B. In this environment 100, the camera 105A is used to capture a left side (e.g., field of view 108A) of a shared view 115 as the image 110A and the camera 105B is used to capture a right side (field of view 108B) of the shared view 115 as the image 110B. A portion of the field of view 108A of the left camera 105A and a portion of the field of view 108B of the right camera 105B represent a common field of view, as illustrated by the shaded portion of the shared view 115. The common field of view includes a cube and a sphere. Based on the shared portions of images 110A and 110B, the images 110A and 110B can be taped together to form a single flat image of the shared view 115.

Even though cameras 105A and 105B have a partial common field of view, any object in the common field of view may not be aligned in images captured by the left camera 105A and the right camera 105B. Thus, as seen in the left image 110A, a part of the sphere appears to the left of the cube and, in the right image 110B, a part of the sphere appears to the right of the cube. This offset 120 of the cube and sphere are due to parallax error. The parallax error is inherent to the conventional camera environment 100 because the distance between the cameras causes the position of objects in the common field of view to be different relative to each to each camera, based on the distance between the cameras. Parallax error can be further exacerbated based on a position of a read window 130 of an image sensor window 140 of an image sensor within each camera. For example, the read window 130 is not necessarily centered on the image sensor window 140 and, therefore, can result in a greater effective distance the cameras 105A and 105B. The position of the read window 130 within an image sensor window 140 is an issue that can arise during the manufacturing of the image sensor and can be adjusted for various purposes, as further described in FIGS. 7 and 8.

FIG. 1B illustrates a 2×1 camera array arranged according to one embodiment of the configurations described herein. In the embodiment, the 2×1 camera array 150 includes two cameras 105C and 105D. In another embodiment, as illustrated and described further in conjunction with FIG. 3, two 2×1 camera arrays 150 are combined to form a 2×2 camera array 150 that includes four cameras. In this array 150, the camera 105C captures a left side (e.g., field of view 108C) of the shared view 115 and the camera 105D captures a right side (e.g., field of view 108D) of the shared view 115. However, the left camera 105C captures an image 110C of the right side of the shared view 115 and the right camera 105D captures an image 110D of the left side of the shared view. The left camera 105C and right camera 105D have a partial common field of view, as illustrated in the shaded portion of array 150. However, the partial common field of view in FIG. 1B has a different shape than the partial common field of view in FIG. 1A. The partial common field of view shared by cameras 105C and 105D includes a cube and a sphere. Based on the shared portions of images 110C and 110D, the images 110C and 110D can be taped together to form a single angled image of the shared view 115.

The angled image formed by taping the images 110C and 110D together is different than the flat image formed by taping the images 110A and 110B together in FIG. 1A. The 2×1 camera array 150 captures images at fields of view that are not parallel, as is the case for the array 100 in FIG. 1A, but instead captures images at fields of view that are angled with respect to each other. The angled image is a result of the configuration of the cameras in the 2×1 camera array 150 as further described in conjunction with FIGS. 2 and 3. Correction of the angled image of the shared view 115 to simulate images captured with parallel fields of view is described further in conjunction with FIG. 9.

Unlike the environment 100 in FIG. 1A, the positioning of the camera within the array 150 of FIG. 1B allows both cameras 105C and 105D to share a portion of the other camera's field of view while minimizing parallax error of any object in the shared portion captured by the cameras 105C and 105D. For instance, the left image 110C includes a smaller portion of the sphere that appears on the left of the cube than left image 110A, and the right image 110D includes a smaller portion of the sphere that appears on the right of the cube than right image 110B. For example, the offset 160 of the left image 110C can be 1-3 pixels when capturing objects within 3 meters of the 2×1 camera array 150. The 2×1 camera array 150 minimizes distance between the cameras 105A and 105B, minimizing parallax error. For example, the distance between the cameras 105C and 105D (measured from the center of each camera lens) can be between 1 mm and 60 mm.

It should be noted that the orientation of cameras 105C and 105D is such that the vectors normal to each camera lens of cameras 105C and 105D intersect within the partial common field of view. In contrast, while the cameras 105A and 105B have a partial common field of view, vectors normal to each camera lens of cameras 105A and 105B do not intersect within the partial common field of view. In embodiments with a 2×2 camera array, vectors normal to each camera lens in the array can intersect within a field of view common to all cameras. For example, for any two cameras, vectors normal to the camera lenses of the two cameras can intersect within a field of view common to all four cameras.

FIG. 2 illustrates roll, pitch, and yaw rotations of a camera in a camera array, according to one embodiment. For example, when minimizing distance between cameras in a camera array, a camera can be rotated in three dimensions: roll 210, pitch 220, and yaw 230. By rotating a camera in these three dimensions to minimize distance between lenses of the camera with another camera, the shared view 115 being captured by each of a plurality of cameras can be captured at tilted, angled, or rotated fields of view. The captured images of the shared view 115 with the tilted, angled, and rotated fields of view can be corrected using image processing as described further in conjunction with FIG. 9.

The camera 105 illustrated in FIG. 2 has a roll 210 rotation in a range of 30-50°, a yaw 230 rotation in a range of 60-80°, and a pitch 220 rotation of 60-80°. The direction of each rotation (i.e., roll 210, yaw 230, pitch 220) of the camera 105 depends on the position of the camera 105 in the array. For example, if the camera 105 was in the top left of a camera array, as illustrated in FIG. 2, the camera 105 would have a negative roll rotation, a negative yaw rotation, and a negative pitch rotation, wherein direction is respective to the arrows illustrated in FIG. 2. If the camera 105 was in the top right of a camera array, the camera 105 would have a positive roll rotation, a positive yaw rotation, and a negative pitch rotation. If the camera 105 was in the bottom left of a camera array, the camera 105 would have a positive roll rotation, a negative yaw rotation, and a positive pitch rotation. If the camera 105 was in the bottom right of a camera array, the camera 105 would have a positive roll rotation, a positive yaw rotation, and a positive pitch rotation. The directions of rotations 210, 220, and 230 can also be based on the shape of the camera 105, as further described in conjunction with FIG. 4. However, in general, the directions of the rotations 210, 220, and 230 are determined to minimize distances between the lenses of the array to a range of, for example, 1 mm-5 mm, as further described in conjunction with FIG. 3. It should be noted in other embodiments, each camera 105 can be oriented at a different roll, yaw, and pitch than described herein.

Figure 3:
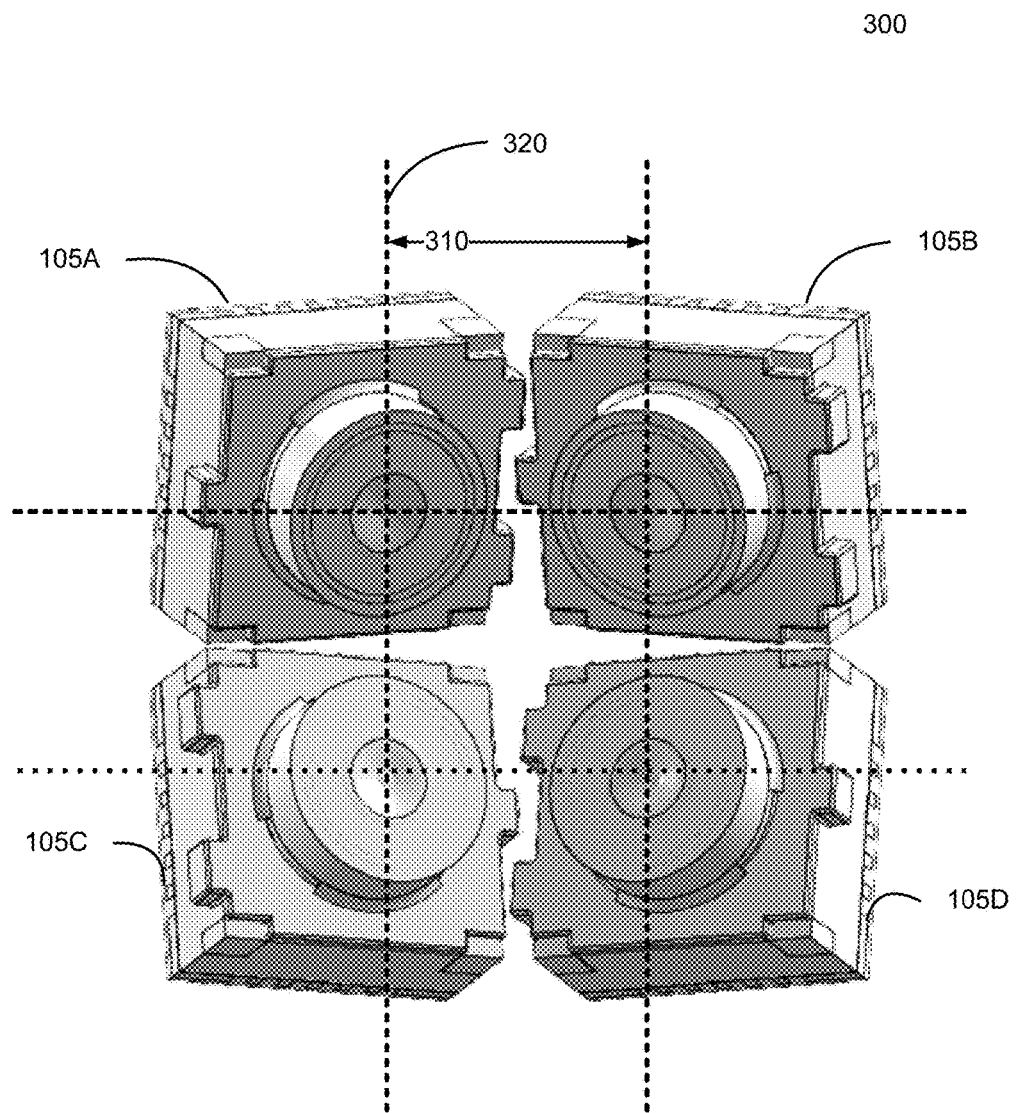
FIG. 3 illustrates a 2×2 camera array arranged according to one embodiment of the configurations described herein.

FIG. 3 illustrates a 2×2 camera array arranged according to one embodiment of the configurations described herein. The 2×2 camera array 300 includes four cameras 105A, 105B, 105C, and 105D. Each camera has a roll rotation, a pitch rotation, and a yaw rotation, the rotations minimizing distance 310 between centers of the lenses, as indicated by the dashed lines 320, to be within a range of, for example, 1 mm to 10 mm. The cameras 105A-D in the illustrated 2×2 camera array 300 each capture an angled image of a shared view of the 2×2 camera array 300. In other words, each camera captures an image of a corresponding field of view, and the corresponding field of views of the cameras overlap but are not parallel. The camera 105A captures the bottom left portion of the shared view, the camera 105B captures the bottom right portion of the shared view, the camera 105C captures the top left portion of the shared view, and the camera 105D captures the top right portion of the shared view. As used herein, "shared view" refers to each of the corresponding fields of view of the cameras 105A-D of the 2×2 camera array 300.

The camera array 300 can be adapted to be at least partially enclosed by a protective camera housing (not illustrated in the embodiment of FIG. 3). In one embodiment, the camera array 300 and/or housing of the array 300 has a small form factor (e.g., a height of approximately 1 to 6 centimeters, a width of approximately 1 to 6 centimeters, and a depth of approximately 1 to 2 centimeters), and is lightweight (e.g., approximately 50 to 150 grams). The housing and/or camera bodies can be rigid (or substantially rigid) (e.g., plastic, metal, fiberglass, etc.) or pliable (or substantially pliable) (e.g., leather, vinyl, neoprene, etc.). In one embodiment, the housing and/or the array may be appropriately configured for use in various elements. For example, the housing may include a waterproof enclosure that protects the camera array 300 from water when used, for example, while surfing or scuba diving. In some embodiments, such as those described below, the camera array can 300 can be secured within a protective multiple camera array module, which in turn can be secured within a camera body in one or more orientations.

Portions of the housing and/or array may include exposed areas to allow a user to manipulate buttons that are associated with the camera array 300 functionality. Alternatively, such areas may be covered with a pliable material to allow the user to manipulate the buttons through the housing. For example, in one embodiment the top face of the housing includes an outer shutter button structured so that a shutter button of the camera array 300 is substantially aligned with the outer shutter button when the camera array 300 is secured within the housing. The shutter button of the camera array 300 is operationally coupled to the outer shutter button so that pressing the outer shutter button allows the user to operate the camera shutter button.

In one embodiment, the front face of the housing includes one or more lens windows structured so that the lenses of the cameras in the camera array 300 are substantially aligned with the lens windows when the camera array 300 is secured within the housing. The lens windows can be adapted for use with a conventional lens, a wide angle lens, a flat lens, or any other specialized camera lens. In this embodiment, the lens window includes a waterproof seal so as to maintain the waterproof aspect of the housing.

In one embodiment, the housing and/or array includes one or more securing structures for securing the housing and/or array to one of a variety of mounting devices. For example, various mounts include a clip-style mount or a different type of mounting structure via a different type of coupling mechanism.

In one embodiment, the housing includes an indicator window structured so that one or more camera array indicators are substantially aligned with the indicator window when the camera array 300 is secured within the housing. The indicator window can be any shape or size, and can be made of the same material as the remainder of the housing, or can be made of any other material, for instance a transparent or translucent material and/or a non-reflective material.

The housing can include a first housing portion and a second housing portion, according to one example embodiment. The second housing portion detachably couples with the first housing portion opposite the front face of the first housing portion. The first housing portion and second housing portion are collectively structured to enclose a camera array 300 within the cavity formed when the second housing portion is secured to the first housing portion in a closed position.

The camera array 300 is configured to capture images and video, and to store captured images and video for subsequent display or playback. The camera array 300 is adapted to fit within a housing, such as the housing discussed above or any other suitable housing. Each camera 105A-D in the array 300 can be an interchangeable camera module. As illustrated, the camera array 300 includes a plurality of lenses configured to receive light incident upon the lenses and to direct received light onto image sensors internal to the lenses.

The camera array 300 can include various indicators, including LED lights and a LED display. The camera array 300 can also include buttons configured to allow a user of the camera array 300 to interact with the camera array 300, to turn the camera array 300 on, and to otherwise configure the operating mode of the camera array 300. The camera array 300 can also include a microphone configured to receive and record audio signals in conjunction with recording video. The camera array 300 can include an I/O interface. The I/O interface can be enclosed by a protective door and/or include any type or number of I/O ports or mechanisms, such as USC ports, HDMI ports, memory card slots, and the like.

The camera array 300 can also include a door that covers a removable battery and battery interface. The camera array 300 can also include an expansion pack interface configured to receive a removable expansion pack, such as a display module, an extra battery module, a wireless module, and the like. Removable expansion packs, when coupled to the camera array 300, provide additional functionality to the camera array 300 via the expansion pack interface.

Figure 4A:
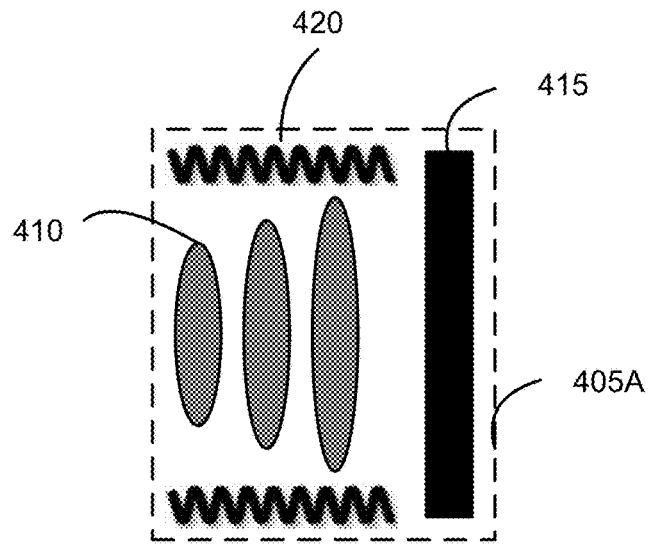
FIG. 4A illustrates a conventional multi-part camera frame, according to one embodiment.
Figure 4B:
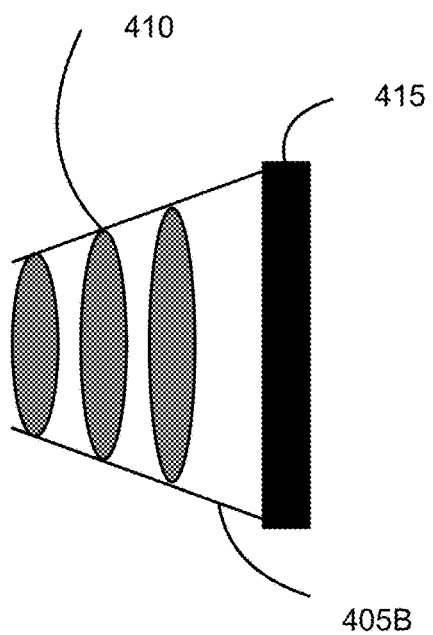
FIG. 4B illustrates a single-body camera frame, according to one embodiment.

FIG. 4A and FIG. 4B illustrate a conventional multi-part camera frame 405A and a single-body camera frame 405B, respectively, according to one embodiment. The conventional multi-part camera frame 405A includes a plurality of lenses 410, an image sensor 415, and auto-focus coils 420. In order to enclose all the components 410, 415 and 420, the frame 405A has a square profile, as illustrated in FIG. 4A. The conventional multi-part camera frame 405A limits the proximity of the center of lenses of two adjacent multi-part camera frames 405A.

A single-body camera frame 405B can be used to improve proximity of the center of lenses of adjacent camera frames. The single-body camera frame 405B (also referred to herein as a "lens stack") includes the plurality of lenses 410 and the image sensor 415 but does not include the auto-focus coils 420. In addition, the single-body camera frame 405B is a single mold that holds the components 410 and 415 within the frame 405B in a fixed position, set by the mold, and minimizes excess space within the frame 405B. The cross-section of the frame 405B is trapezoidal in shape, allowing adjacent cameras to be configured such that the proximity between the centers of the lenses of the cameras is reduced. In some embodiments, for lenses that are approximately 1 mm in diameter, the distance between the centers of the lenses of adjacent cameras is 1 mm or less.

Camera Array Block Diagrams

Figure 5:
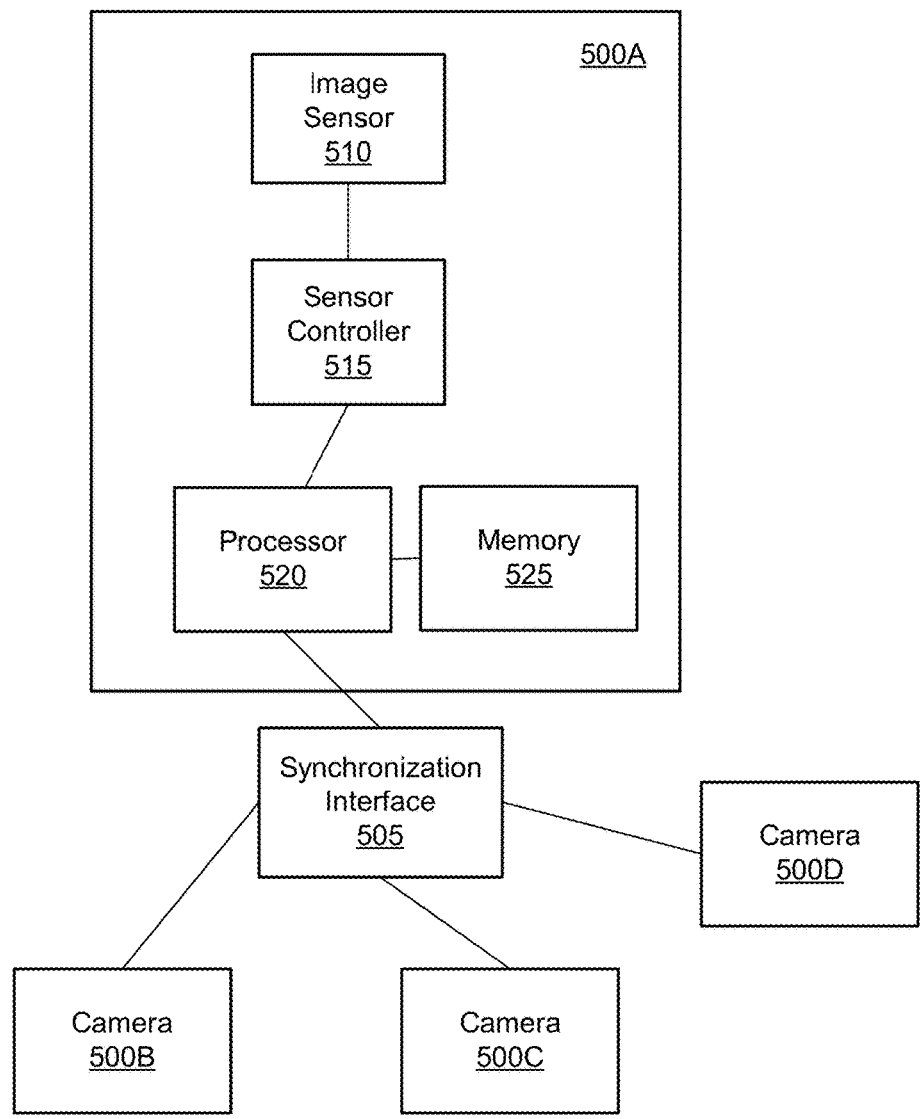
FIG. 5 illustrates a block diagram of a multiple camera array, according to one embodiment.

FIG. 5 illustrates a block diagram of a multiple camera array, according to one embodiment. The array 300 includes four cameras 500A, 500B, 500C, and 500D, for example of cameras 105A, 105B, 105C, and 105D of FIG. 3, and each camera includes an image sensor 510, a sensor controller 515, a processor 520, and memory 525. In another embodiment, the four cameras 500A, 500B, 500C, and 500D can have image sensors that share a common processor 520, and memory 525. The synchronization interface 505 synchronizes the four cameras 500A, 500B, 500C, and 500D to synchronously capture images. In various embodiments, the cameras 500A, 500B, 500C, and 500D can include additional, fewer, or different components for various applications. As used herein, the synchronous capture of images refers to the capture of images by two or more cameras at substantially the same time, or within a threshold period of time.

The image sensor 510 is a device capable of electronically capturing light incident on the image sensor 510. In one embodiment, CMOS sensors are used, including transistors, photodiodes, amplifiers, analog-to-digital converters, and power supplies. In one embodiment, the image sensor 510 has rolling shutter functionality, and can capture light incident upon different portions of the image sensor at slightly different times. Alternatively, the image sensor 510 can be a CCD sensor configured to can capture the portions of the image at substantially the same time. In one embodiment, the image sensor 510 has an adjustable read window 130. An adjustable read window 130 can modify the portions of an image sensor that are exposed to light and read to capture an image, or can modified the portions of an image sensor completely exposed to light that are read out to capture an image. By adjusting the read window 130, the camera 500A can modify when a portion of an image is captured relative to when image capture begins. For example, by shifting the read window 130 in a rolling shutter direction, the image sensor captures portions of the image in the read window 130 earlier than if the read window 130 was not shifted in the rolling shutter direction. Additionally, adjusting the read window 130 can be used to address inherent tolerance issues with the camera 500A and adjust convergence point of the camera array, as further described in conjunction with FIGS. 7 and 8.

The processor 520 is one or more hardware devices (e.g., a central processing unit (CPU), a graphics processing unit (GPU), a digital signal processor (DSP), and the like) that execute computer-readable instructions stored in the memory 525. The processor 520 controls other components of the camera based on the instructions that are executed. For example, the processor 520 may send electronic control signals to the image sensor 510 or use the synchronization interface 505 to send data to cameras 500B, 500C, and 500D.

The memory 525 is a non-transitory storage medium that can be read by the processor 520. The memory 525 may contain volatile memory (e.g., random access memory (RAM)), non-volatile memory (e.g., a flash memory, hard disk, and the like), or a combination thereof. The memory 525 may store image data captured by the image sensor 510 and computer-readable instructions to be executed by the processor 520.

The sensor controller 515 controls operation of the image sensor 510 and other functions of the camera 500A. The sensor controller 515 can include physical and/or electronic input devices, such as exterior buttons to start recording video and/or capture a still image, a touchscreen with tap-to-focus capabilities, and a dial/button combination for navigating a menu hierarchy of the camera 500A. In addition, the sensor controller 15 may include remote user input devices, such as remote controls that wirelessly communicate with the cameras 500A-D. The image sensor 510 may function independently of the sensor controller 515. For example, a slave camera in a master-slave pairing can receive a signal from the master camera to capture an image through the synchronization interface 505.

The synchronization interface 505 sends data to and receives data from cameras 500A, 500B, 500C, and 500D, or an external computing system. In particular, the synchronization interface 505 may send or receive commands to cameras 500A, 500B, 500C, and 500D for simultaneously capturing an image and/or calibrating synchronization with the cameras 500A, 500B, 500C, and 500D (e.g., sending or receiving a synchronization pulse). In the illustrated embodiment of FIG. 5, there is one synchronization interface 505 controlling the cameras 500A, 500B, 500C, and 500D. In another embodiment, there can be a plurality of synchronization interfaces 505 controlling the cameras 500A-D, for instance, one synchronization interface 505 per camera.

Figure 6:
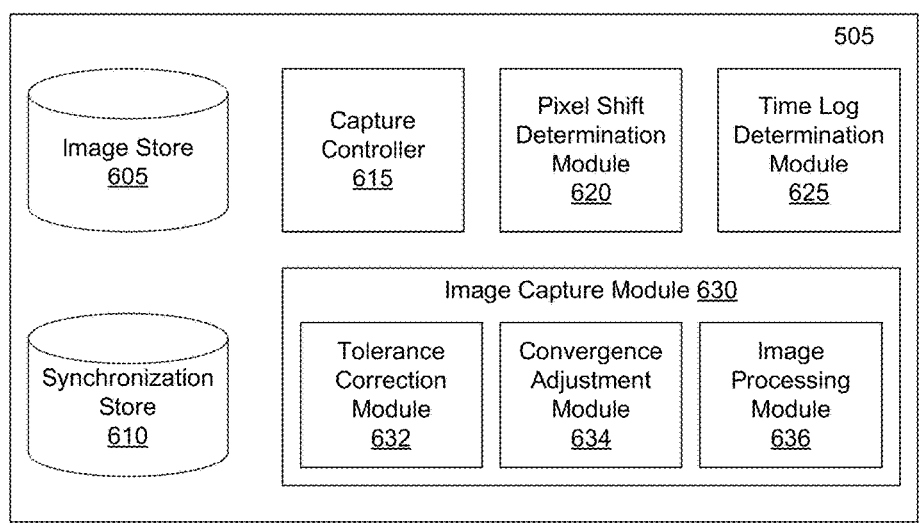
FIG. 6 illustrates a block diagram of a synchronization interface for a multiple camera array, according to one embodiment.

FIG. 6 illustrates a block diagram of a synchronization interface for a multiple camera array, according to one embodiment. The synchronization interface 505 includes an image store 605, a synchronization store 610, a capture controller 615, a pixel shift determination module 620, a time lag determination module 625, and an image capture module 630. Alternate embodiments may have one or more additional, omitted, or alternative modules configured to perform similar functionality. It should be noted that in other embodiments, the modules described herein can be implemented in hardware, firmware, or a combination of hardware, firmware, and software. In addition, in some embodiments, a first camera in a plurality of cameras includes the components illustrated in FIG. 6, while the other cameras in the plurality of cameras do not necessarily include the components of FIG. 6 and instead merely synchronously capture an image in response to a signal from the first camera. As used herein, a "plurality of images" refers to a plurality of images captured synchronously by the plurality of cameras, each camera capturing a portion of a field of view shared with two adjacent cameras. Alternatively or additionally, an external computing device processes image data captured by the camera array.

The image store 605 is configured to store a plurality of images synchronously captured by each of a plurality of cameras, such as the cameras 500A-D of FIG. 5. The synchronization store 610 is configured to store received camera synchronization data. Examples of synchronization data include time lags between cameras due to network lag or internal component lag (e.g., lag from the synchronization interface 505, the processor 520, the sensor controller 515, and the like). The synchronization store 610 is configured to store calibration settings, such as read window shift information and a calibrated time lag for initiating image capture, for use in calibrating the cameras in a camera array based on, for example, camera synchronization data.

The capture controller 615 controls image capture by the image sensor 510. In one embodiment, the capture controller 615 applies a calibration correction to synchronize image capture with one or more additional cameras, for instance based on synchronization or calibration data stored in the synchronization store 610. The calibration correction may include a read window shift by a determined number of pixels, as determined by the pixel shift determination module 620. The calibration correction may include, alternatively or additionally, a time lag for one of the cameras in the array to delay relative to the other camera of the array before beginning image capture, as determined by the time lag determination module 625.

The pixel shift determination module 620 identifies a pixel shift between an image captured by a first camera 500A, an image captured by a second camera 500B, an image captured by a third camera 500C, and an image captured by a fourth camera 500D. This pixel shift indicates spatial misalignment between the image sensors of the cameras 500. In one embodiment, the pixel shift determination module 620 determines a pixel shift in a rolling shutter direction due to a misalignment between the image sensors along the rolling shutter direction. The capture controller 615 can use the determined pixel shift to correct the misalignment between the image sensors.

The time lag determination module 625 determines a time lag between the capture of an image row by a first camera 500A, a corresponding image row of a second camera 500B, a corresponding image row of a third camera 500C, and a corresponding image row of a fourth camera 500D. The time lag determination module 625 can determine a time lag based on a pixel shift received from the pixel shift determination module 620. Using the determined time lag, $t_{lag}$, the capture controller 615 synchronizes the plurality of cameras by delaying image capture of a first of the plurality by the time lag relative to a second, third and fourth of the plurality. In one embodiment, an image sensor has an associated row time, $t_{row}$, which represents an elapsed time between exposing a first pixel row and a second, subsequent pixel row. If images taken by a plurality of cameras are determined to have a pixel shift of n pixels, then the time lag $t_{lag}$ required to correct the pixel shift can be determined using the following equation:

$$t_{lag} = t_{row} \times n$$

In one embodiment, calibrating image capture between cameras in a plurality of cameras involves synchronously capturing images with the plurality of cameras, determining a pixel shift between the captured images, and applying a determined correction iteratively until the determined pixel shift is less than a pre-determined pixel shift threshold. The calibration process may be initiated when cameras are powered on or paired, when the cameras are manufactured, when the camera array is assembled, or in response to a manual initiation of the calibration process by a user of the camera array. A master camera system can initiate the calibration process after an amount of time elapses that is greater than or equal to a pre-determined threshold since a previous calibration. In an embodiment with additional cameras, additional calibrations can be performed among other cameras in response to the calibration of the master camera.

The image capture module 630 processes captured images. In an alternative embodiment not described further herein, the captured images are processed outside of the synchronization interface 505, for instance by a system external to the camera array. The image capture module 630 includes a tolerance correction module 632, a convergence adjustment module 634, and an image processing module 636. Alternative embodiments may have one or more additional, omitted, or alternative modules configured to perform similar functionality.

The tolerance correction module 632 shifts read windows of the plurality of cameras 500 to correct for tolerances in each camera in the plurality. For example, each camera can have slight differences in read window location due to manufacturing discrepancies and product tolerances of the cameras. In addition, image sensors of the plurality of cameras can have varying read window locations. These variations from camera to camera can be due to discrepancies between locations and orientations of the image sensor within each camera. For example, if the image sensor is a complementary metal-oxide-semiconductor (CMOS) sensor, the location of the read window for each CMOS sensor can shift due to the sensitivity of pixel sensors used in each CMOS sensor. Shifted read window locations in CMOS sensors of cameras in the camera array can shift the field of views of cameras, as shown in the field of views of cameras in the camera array 700 in FIG. 7A. This can result in a shifted shared field of view (e.g., shaded portion unaligned with the field of views of the cameras in the camera array 700). For example, the tolerance correction module 632 can recognize a shift in read window locations based on outputs of pixel sensors in the read windows. The outputs of image sensors in a first region of a first camera and a second region of a second camera, where the first region and the second region overlap, can be compared, and the location of the read window of an image sensor of the first camera, the second camera, or both can be shifted based on the comparison. For instance, upon comparing overlapping image sensor regions, if a determination is made that a first of the regions is offset from a second of the regions by a determined number of pixels, the first region or the second region can be shifted by the number of pixels (for instance, by adjusting a location of the read window on an image sensor by the number of pixels) to align the regions. The process of correcting for tolerance of the cameras 500 is further described below in conjunction with FIG. 7.

The convergence adjustment module 634 can dynamically adjust a read window in an image sensor based on image data captured by the camera array. For example, if the camera array is capturing an image of an object in a foreground, the convergence point of the plurality of cameras in the camera array can be adjusted closer to the camera array and, if capturing an object in a background, the convergence point of the plurality of cameras in the camera array can be adjusted farther away from the camera array. In another example, the convergence point of the camera array is only adjusted by the convergence adjustment module 634 if the depth of the object in the field of view of the camera array exceeds a threshold distance. The convergence adjustment can be done manually by a user of the camera array or automatically by the convergence adjustment module 634 based on image processing algorithms measuring a depth of an object in the field of view of the camera array. The process of adjusting convergence of the plurality of cameras 500 is further described in conjunction with FIG. 8.

The image processing module 636 adjusts images captured by the camera array to compensate for the angled fields of view of the cameras of the camera array. The images are adjusted using, for example warps, transformations, crops, or any other suitable image enhancement, restoration, and/or compression techniques. One or more of the images can be adjusted individually, or all of the images can be adjusted substantially synchronously or sequentially. For example, prior to and during the taping of the images to produce a simulated flat image, as further described below in conjunction with FIG. 9.

Read Window Adjustment

Figure 7A:
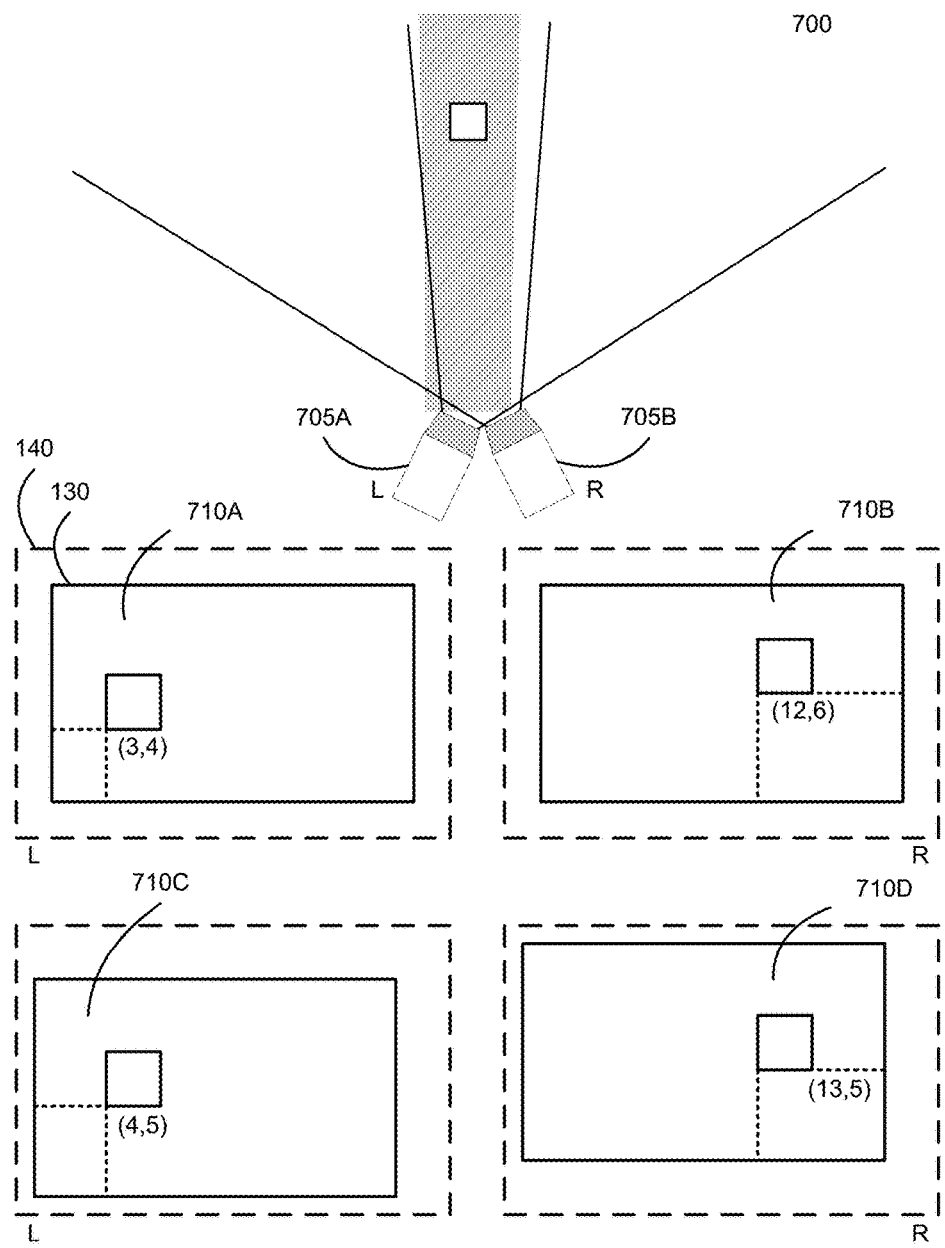
FIG. 7A illustrates a read window adjustment for each image sensor in a multiple camera array for tolerance compensation, according to one embodiment.

FIG. 7A illustrates a read window adjustment for each image sensor in a multiple camera array for tolerance compensation, according to one embodiment. For example, illustrated is an imperfectly aligned 2×1 camera array 700 illustrated in the shaded area misaligned with the lines representing the common field of view of the cameras in the camera array 700. A portion of each of the fields of view of cameras 705A and 705B is common to both fields of view, and includes a cube. However, images 710A and 710B captured by the cameras 705A and 705B, respectively, illustrate that the cube is not aligned on the x-axis or y-axis of the read windows of the image sensors in the cameras 705.

In the illustrated example, the images 710A and 710B display the corner of the cube at (x,y) coordinates (3,4) and (12,6), respectively, where the read window has a height of 12 pixels and 20 pixels and the cube a width of 3 pixels. Thus, the cube has different heights within the read windows, and has different locations along the x-axis within the read windows. The read window of the image sensor of each camera in the plurality of cameras 705A and 705B can be adjusted to display the center of the cube at the same height in the y-axis and distance from the respective edges in the x-axis. Images 710C and 710D illustrate adjusted read windows, showing the corner of the cube displayed at (4,5) and (13,5), respectively (a same height and distance from the image edge). Detection of the cube can be an automatic process based on an object detection algorithm or assisted by a user of the camera array 700 and the user's input.

Figure 7C:
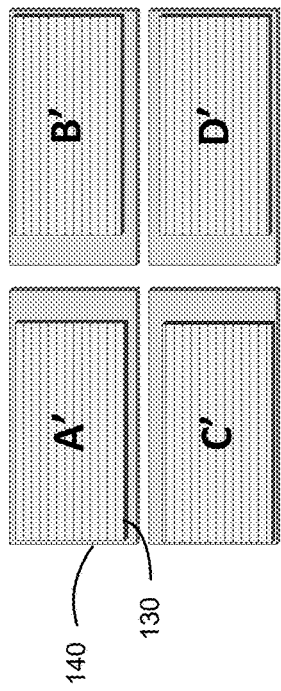
FIG. 7C illustrates aligned read windows within image sensor capture windows of a multiple camera array, according to one embodiment.
Figure 7B:
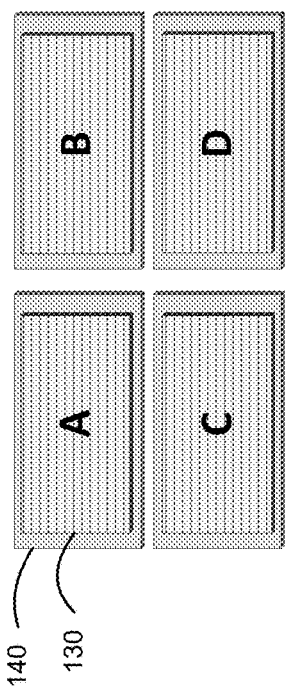
FIG. 7B illustrates unaligned read windows within image sensor capture windows of a multiple camera array, according to one embodiment.

FIG. 7B illustrates unaligned read windows 130 within image sensor windows 140 of a multiple camera array, according to another embodiment. Images captured with unaligned read windows 130 in a multiple camera array have can significant decorrelation within the overlapping portions of the captured images. Aligning the read windows 130 within the image sensor capture windows 140 of a multiple camera array can increase the correlation between overlapping portions of captured images, thus beneficially improving performance when stitching together adjacent images as described further herein below.

To align the read windows 130 within a multiple camera array, an object of interest can be identified. For instance, if a multiple camera array is used to capture a set of images (one per camera) of a garden, a garden flower within the images can be selected. A set of correlation coefficients representative of an amount of decorrelation within the overlapping portions of the captured set of images is determined. The set of correlation coefficients can be weighted such that correlation coefficients associated with the identified object of interest are weighted more heavily than other correlation coefficients. In some embodiments, correlation coefficients associated with a center region representative of an overlap between each of the images in the set of images are weighted more heavily. In some embodiments, the further away from the object of interest or the center region a correlation coefficient is, the less it is weighted.

Figure 7D:
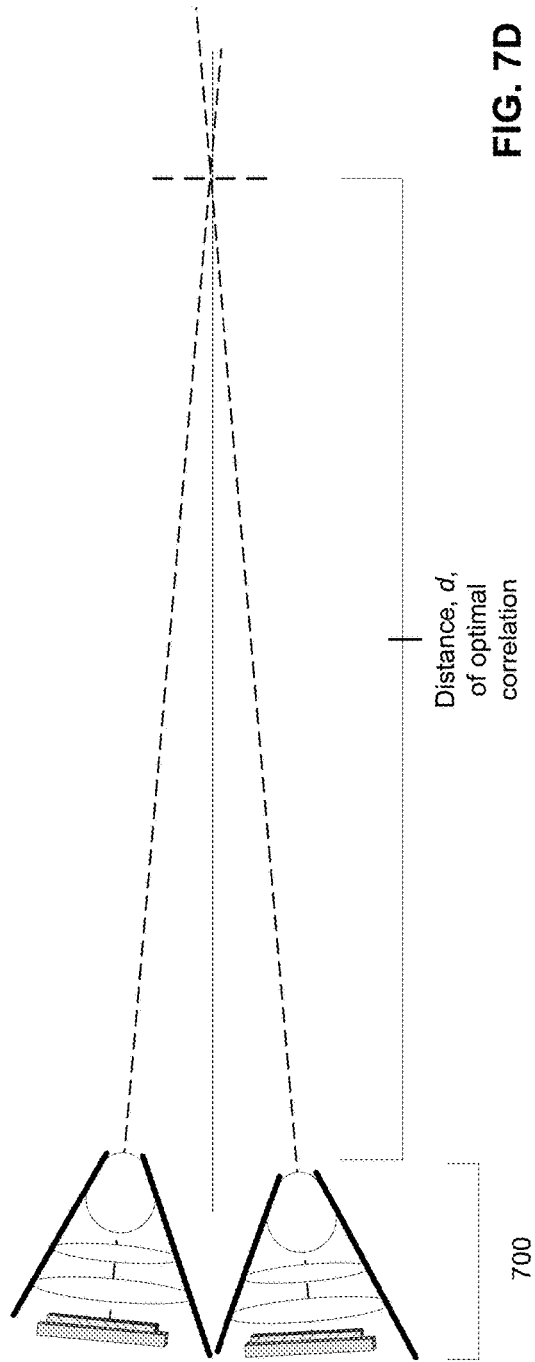
FIG. 7D illustrates a distance of optimal correlation between image sensors of a multiple camera array.

The read windows 130 (such as read windows A, B, C, and D of FIG. 7B) are adjusted (moved within an image sensor capture window 140) such that the weighted set of correlation coefficients is lowest. In other words, the read windows 130 are re-located within the image sensor capture windows 140, a set of correlation coefficients is determined for a set of images captured using the adjusted read windows 130 of a multiple camera array, and if the resulting weighted set of correlation coefficients is representative of less decorrelation, the adjusted read windows 130 are selected over the previous read windows 130. In some embodiments, read windows 130 can be adjusted using a lookup table or function describing a relationship between correlation coefficients and read window location/adjustment. In some embodiments, instead of using a set of correlation coefficients, other representations of correlation within overlapping read window portions can be used such that a minimum or near-minimum entropy can be determined in response to the iterative adjusting of read windows as described herein This process can be repeated a number of times, for instance, until the captured images represent a below threshold level of decorrelation. FIG. 7C illustrates aligned read windows 130 A', B', C', and D' within image sensor capture windows 140 of a multiple camera array, according to one embodiment. In some embodiments, read windows 130 are adjusted until the line of sight of each lens in a multiple camera array converges at a distance d determined to result in an optimal level of correlation between a captured set of images. FIG. 7D illustrates a distance of optimal correlation between image sensors of a multiple camera array 700.

Figure 8A:
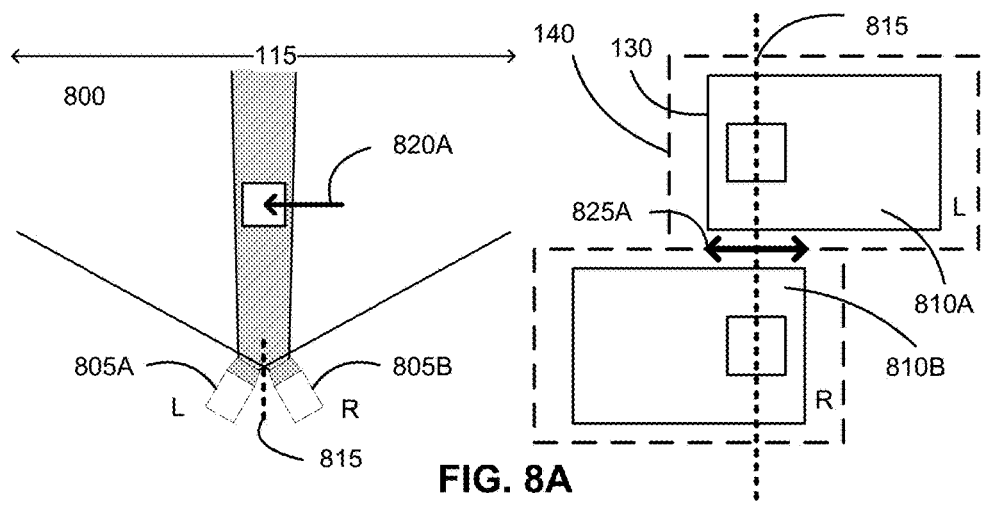
FIGS. 8A-8C illustrates a read window adjustment for each image sensor in a multiple camera array for convergence point adjustment, according to one embodiment.
Figure 8B:
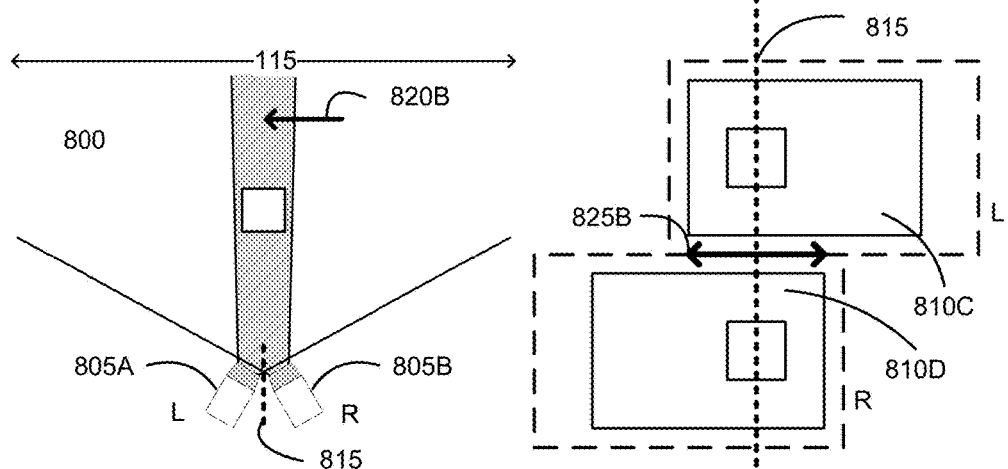
Figure 8C:
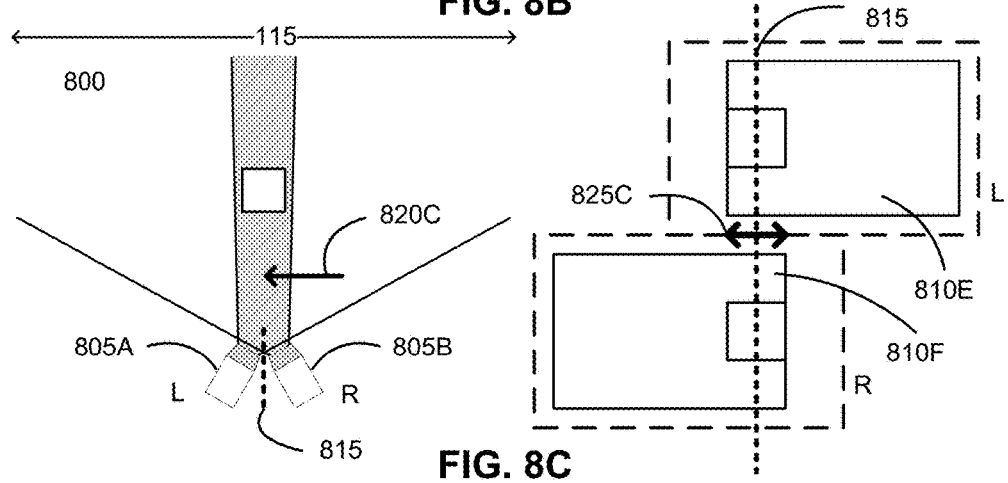

FIGS. 8A-8C illustrates a read window adjustment for each image sensor in a multiple camera array for convergence point adjustment, according to one embodiment. A plurality of read windows 130 of image sensor windows 140 in a camera array 800 and a corresponding convergence point 820 based on a distance 825 of a shift of the read windows are illustrated in FIGS. 8A-8C. As illustrated in FIG. 8A, the camera array 800 includes a left camera 805A and a right camera 805B that capture an image 810A of the right side of a shared view 115 and an image 810B of the left side of the shared view 115. The substantial center 815 between the cameras 805 results in a substantial center of a portion of shared fields of view of the captured images 810A and 810B, as shown in the vertical dotted lines 815. Both captured images 810A and 810B capture a cube seen by both cameras 805A and 805B within the shared view 115.

When capturing the shared view 115, the distance between the center of the lenses of the cameras 805A and 805B affect the convergence point 820 of the lenses of the cameras 805A and 805B. This distance between the center of the lenses can be increased and decreased by shifting the read windows 130 of the image sensor windows 140 within the cameras 805A and 805B, as illustrated in FIG. 8A-8C. Thus, the distance 825A of the portion of the shared fields of view between the cameras 805A and 805B in the read windows 130 affects the distance between the center of the lenses of the cameras 805A and 805B and results in a convergence point at 820A.

For example, as the distance 825 increases, as seen in distance 825B in FIG. 8B, the distance between the center of the lenses of the cameras 805A and 805B decreases, because the distance between the read windows decreases, and results in a convergence point at 820B behind the object, farther from the camera array 800. As the distance 825 decreases, as seen in distance 825C in FIG. 8C, the distance between the center of the lenses of the cameras 805A and 805B increases, because the distance between the read windows increases, and results in a convergence point at 820C in front of the object, closer to the camera array 800.

In various embodiments, the distance between the read windows can increase or decrease from shifting one or both of the read windows of the image sensors of the cameras 805A and 805B. The shift of the read windows can be done automatically based on object detection algorithms or by a manual input of a user using the camera array 800. For example, a user can input a setting or a mode (e.g., landscape, portrait, macro, sports, night, movie) and based on the input the read windows are shifted to better capture an image of that type of mode.

Image Processing & Taping

Figure 9A:
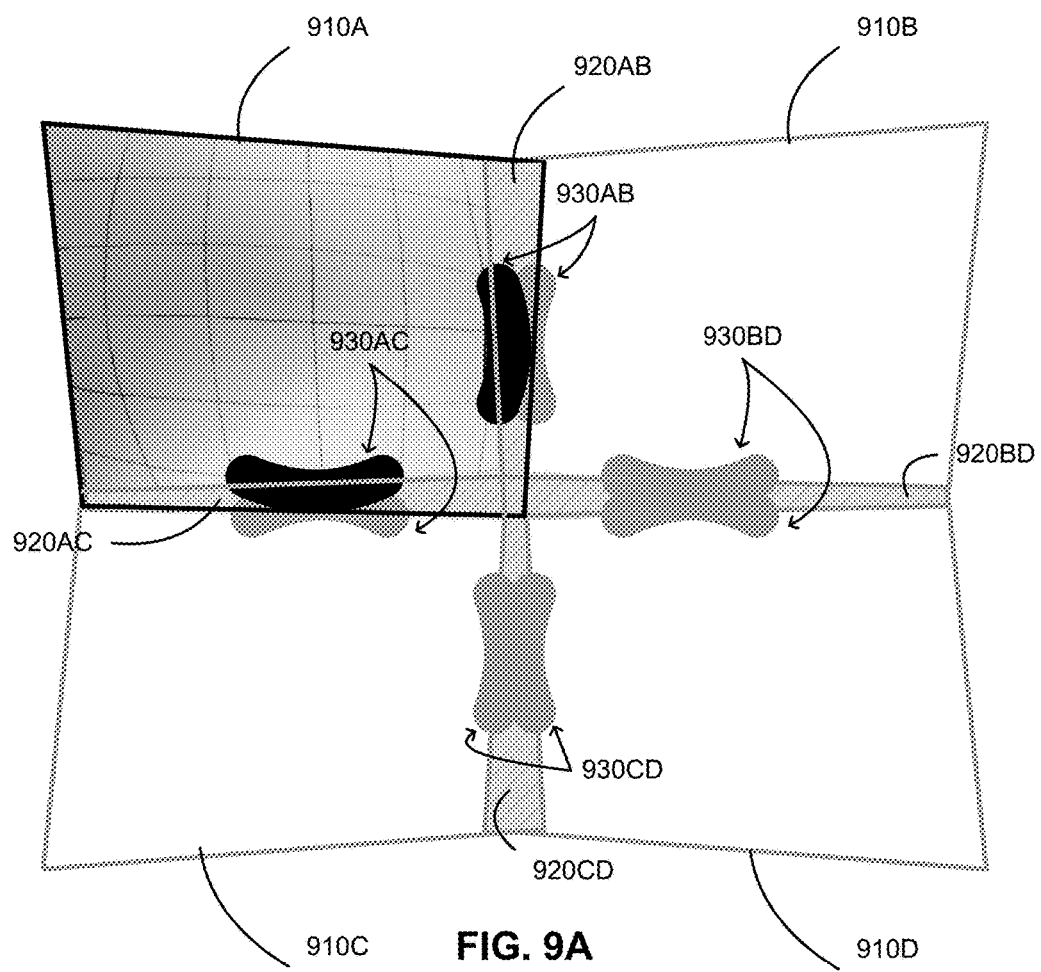
FIG. 9A illustrates a set of images captured by cameras in a 2×2 camera array, according to one embodiment.

FIG. 9A illustrates a set of images captured by cameras in a 2×2 camera array, according to one embodiment. For example, the camera array 300 of FIG. 3 collectively captured a shared view 115, the camera 105A captured image 910C, the camera 105B captured image 910D, the camera 105C captured image 910A, and the camera 105D captured image 910B. For purposes of discussion, the image processing steps discussed herein will be discussed in the context of the image 910A captured by the camera 105C. However, the image processing steps are also performed in the same order on the other images 910B, 910C, and 910D. In another embodiment, the image processing steps applied to the images can be different than the image processing steps described herein, or can be performed in a different order on the other images 910B, 910C, and 910D.

The images captured by the camera array can vary in distortion and warp based on the camera in the camera array or the position of the camera in the camera array (e.g., roll, pitch, yaw, etc.). Thus, as seen in image 910A, if the camera is a fish eye camera, the captured image 910A has a fish eye distortion. In addition, the portions of the shared field of view of image 910A are angled at a different orientation than adjacent images 910B and 910C, as each image was captured at different angled fields of view. Since the images 910A, 910B, 910C, and 910D are of a shared view and each image shares a portion of a shared field of view 920 with an adjacent image, common objects, such as objects 930, are visible in the portions of the shared field of view 920. For example, the common object 930AB between 910A and 910B is in the portion of the shared field of view 920AB, the common object 930AC between 910A and 910C is in the portion of the shared field of view 920AC, the common object 930BD between 910B and 910D is in the portion of the shared field of view 920BD, and the common object 930CD between 910C and 910D is in the portion of the shared field of view 920CD. Thus, each image has a first portion representative of an overlapping field of view with a corresponding portion of a horizontally adjacent image and a second portion representative of an overlapping field of view with a corresponding portion of a vertically adjacent image. In the example shown, each common object 930 is warped differently in each adjacent image due to the fish eye distortion.

Figure 9B:
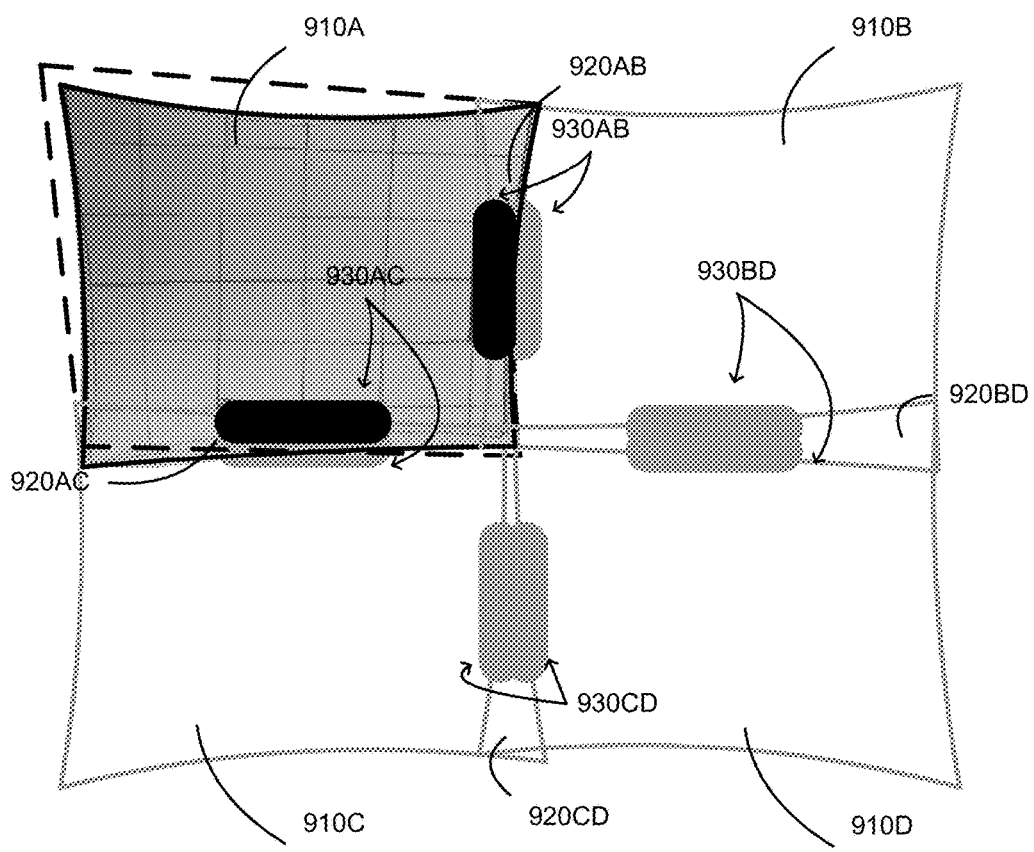
FIG. 9B illustrates the images of FIG. 9A aligned based on overlapping portions, according to one embodiment.

FIG. 9B illustrates the captured images of FIG. 9A aligned based on the overlapping portions, according to one embodiment. Following the example from before, the common objects 930 are supposed to be vertical and horizontal straight lines but are warped due to the fish eye distortion. Therefore, since the common objects 930 are supposed to be straight or, in general, since the shapes of the common objects 930 are known, the captured images of FIG. 9A (illustrated in the dotted line around image 910A) can be processed, as illustrated in FIG. 9B, so that common objects 930 are aligned between adjacent images (in other words, so that common objects 930 have the correct orientation and shape between adjacent images). The alignment can be performed by a warp function or any other suitable image processing algorithm that stretches the image in a manner that results in the common object 930 being aligned in shape and orientation between adjacent images. In one embodiment, the warp only straightens the common objects 930 or corrects distortion of the common objects 930 and regions near the common objects 930 while leaving the outer edges farther from the common objects in their distorted state. In the embodiment shown here, the warp is performed not locally but on the entire image 910, resulting in correction of the common objects 930 and warping of the outer edges of the images 910.

Figure 9C:
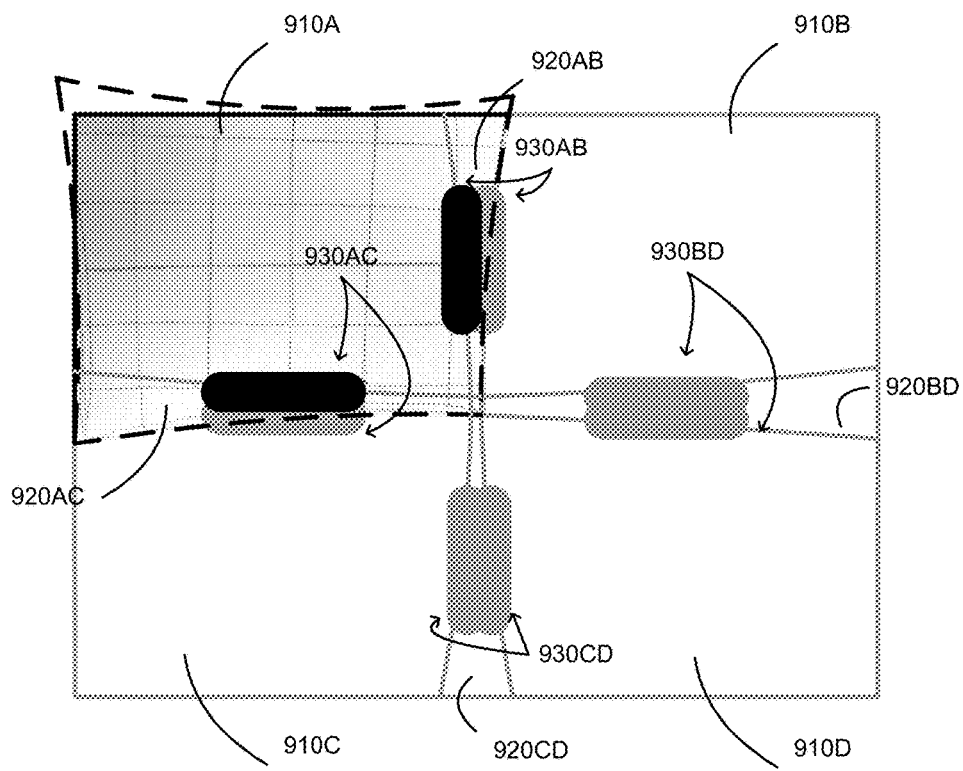
FIG. 9C illustrates the aligned images of FIG. 9B cropped to remove excess portions not horizontally or vertically aligned with corresponding adjacent images, according to one embodiment.

FIG. 9C illustrates the aligned images of FIG. 9B cropped to remove excess portions not horizontally or vertically aligned with corresponding adjacent images, according to one embodiment. The aligned images (illustrated in the dotted line around image 910A) are cropped (such as the image 910A) along the x-axis and y-axis of the image at the outer edges of the four images 910A, 910B, 910C, and 910D, resulting in a cropped image with at least 2 straight edges (as illustrated in each of the images in FIG. 9C). In other words, for each image, portions of the image that are not both horizontally and vertically aligned with portions of the image representative of shared fields of view with adjacent images are cropped.

Figure 9D:
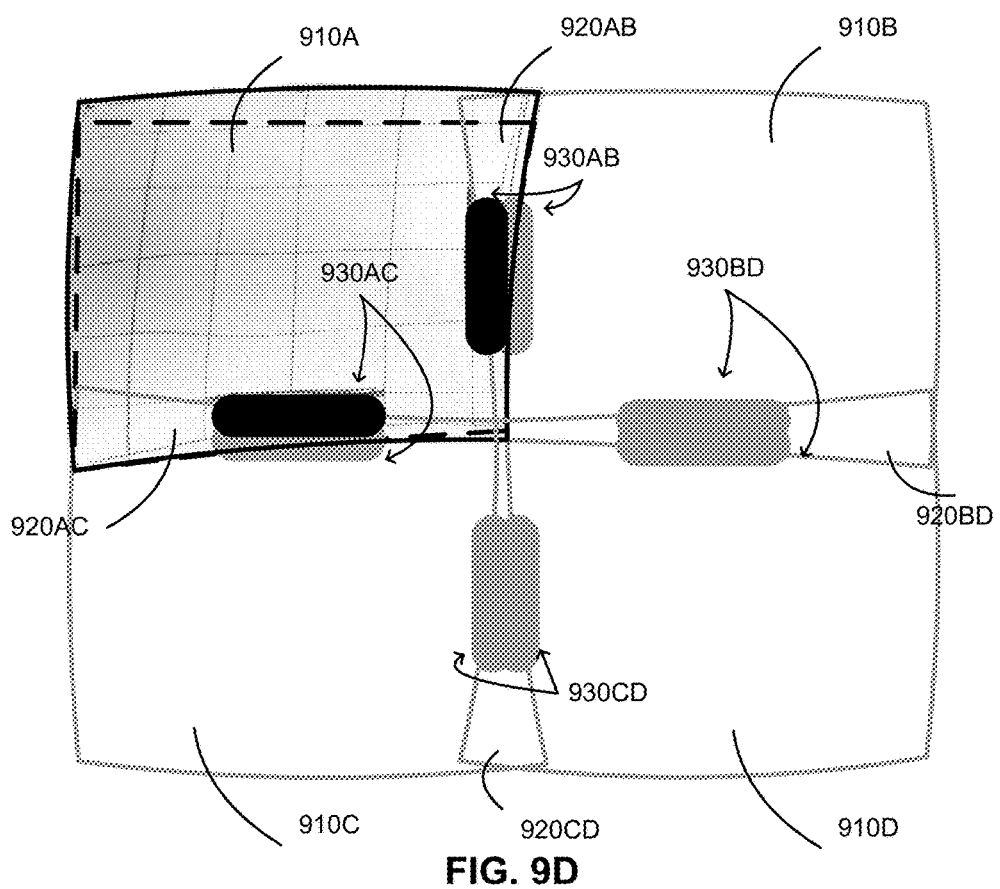
FIG. 9D illustrates the cropped images of FIG. 9C warped to correct for distortions based on the alignment, according to one embodiment.

FIG. 9D illustrates the cropped images of FIG. 9C warped to correct for distortions based on the alignment, according to one embodiment. For example, when the aligned images are warped to straighten out the common objects 930, the outer edges of the aligned images are also warped. The magnitude of the warping to correct for distortions here is based on a distance of the portion to the first portion of the image and the second portion of the image, wherein the magnitude of the second warping of a first portion of the image representative of a shared field of view with an adjacent image and a second portion of the image representative of a shared field of view with an adjacent image is substantially 0. In an embodiment where only the regions near the common objects 930 are warped, there is no need for correcting distortions of the cropped images of FIG. 9C.

In general, the distortions corrected are the distortions caused by the alignment step from FIG. 9A to 9B. Therefore, if there are no distortions to correct after alignment, this step is not required. Following the example illustrated, however, the outer edges of the aligned images are warped during alignment and, therefore, the distortions of the outer edges are corrected here using warp techniques and other transforms. In general, any image processing algorithm that performs the function of correcting for distortion can be performed here. The image processing algorithms performed here, however, may not affect the common objects 930. In this example, the common object 930 is a line and, therefore, the image processing algorithms performed here to correct for distortions do not warp the common objects 930 and the common objects 930 are still linear in shape after the images 910 are corrected for distortions.

Figure 9E:
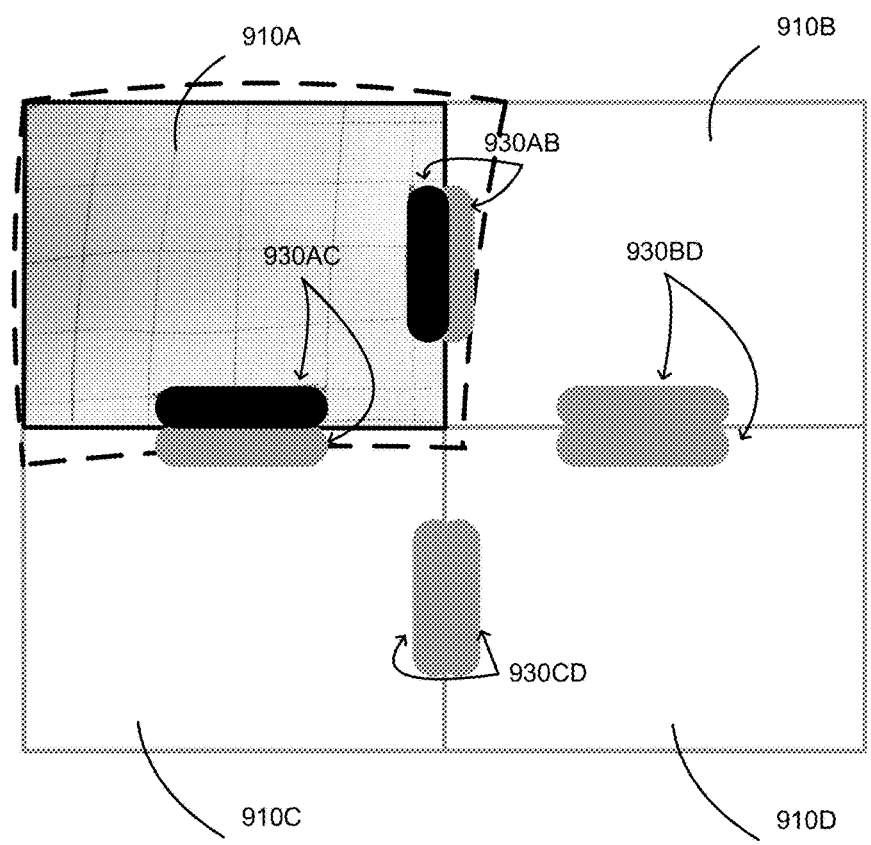
FIG. 9E illustrates the corrected images of FIG. 9D cropped to remove excess portions and overlapping portions, according to one embodiment.

FIG. 9E illustrates the corrected images of FIG. 9D cropped to remove excess portions and overlapping portions, according to one embodiment. The excess portions on the outer edges of the images 910 are removed as well as the overlapping portions of shared fields of view. Then, a final image of the shared view being captured by the camera array is generated by taping each cropped image to a horizontally adjacent cropped image and a vertically adjacent cropped image. In other embodiments, the overlapping portions of the corrected images of FIG. 9D are substantially reduced and each image is concatenated with each corresponding horizontally and vertically adjacent cropped image.

ADDITIONAL EMBODIMENTS

Figure 10A:
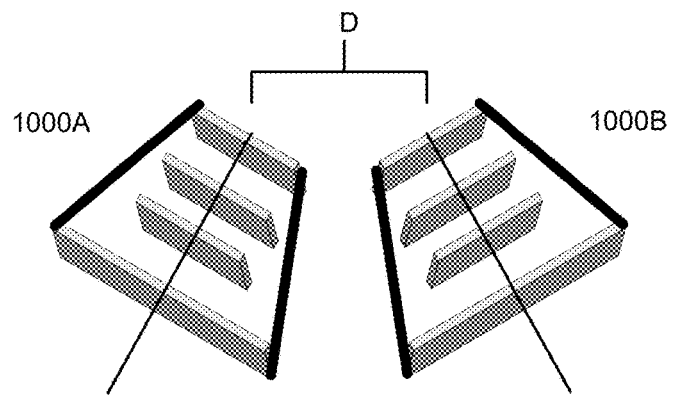
FIG. 10A illustrates a distance between two lens modules in a multiple camera array, according to one embodiment.

FIG. 10A illustrates a distance between two lens modules in a multiple camera array, according to one embodiment. The lens modules 1000A and 1000B have some distance D between the centers of the lenses. The distance between the lenses results in a parallax error, which must be corrected for when stitching together images captured in a multiple camera array. Parallax error is introduced even when the lens modules are placed very close together, for instance 5 mm or less.

Figure 10B:
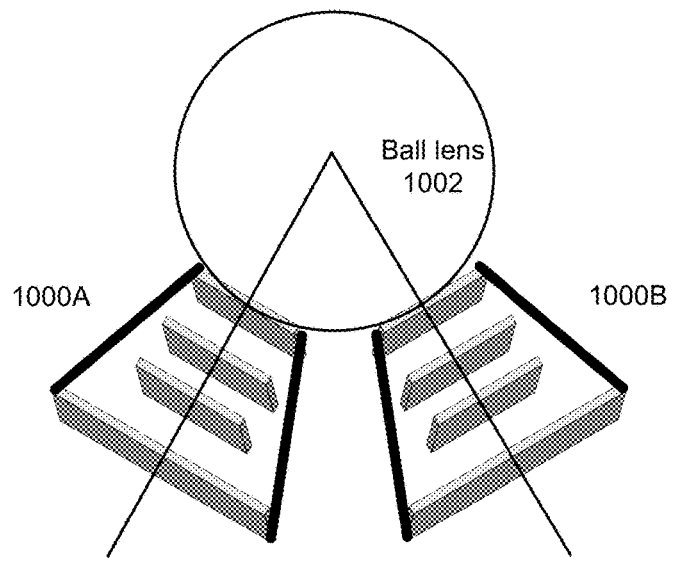
FIG. 10B illustrates a ball lens for use in a multiple camera array, according to one embodiment.

To help reduce or eliminate parallax error, a single lens can be used for multiple cameras in a multiple camera array. In some embodiments, the common lens is a ball lens. FIG. 10B illustrates a ball lens for use in a multiple camera array, according to one embodiment. The ball lens 1002 is used for both lens module 1000A and 1000B. It should be noted that although only two lenses are illustrated in the embodiment of FIG. 10B, a common lens (such as the ball lens 1002) can be used for any or all of the cameras in a multiple camera array, such as all 4 cameras in a 2×2 camera array.

The optical paths of light through the ball lens 1002 and upon each lens module 1000 intersects within the ball lens 1002. Accordingly, the distance D between the centers of the lenses is reduced to zero, effectively eliminating parallax error. It should be noted that in some embodiments, a ball lens 1002 introduces distortion to images captured using a ball lens 1002; in such embodiments, an additional warp function can be applied to each image captured using the ball lens 1002 prior to stitching the images together to reduce the effects of the distortion introduced by the ball lens 1002.

Figure 11A:
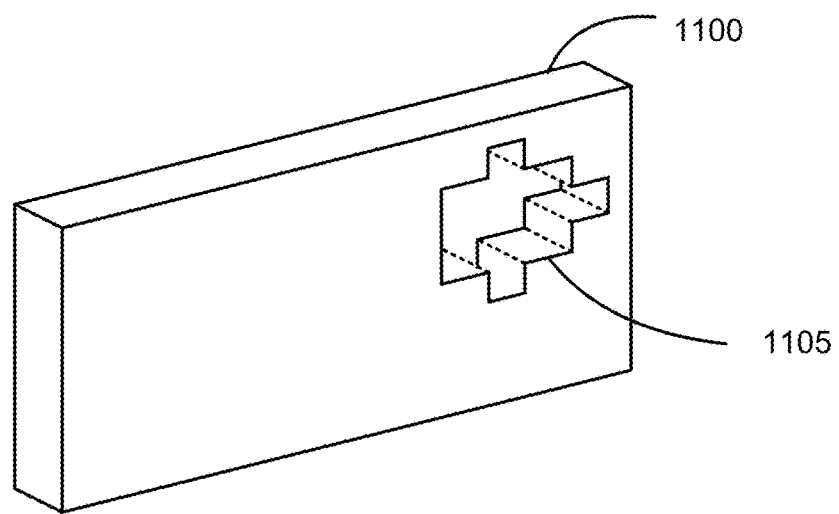
FIG. 11A illustrates a camera body configured to receive a multiple camera array in a plurality of configurations, according to one embodiment.

FIG. 11A illustrates a camera body 1100 configured to receive and secure a multiple camera array module 1110 in a plurality of configurations, according to one embodiment. The camera body 1100 can include camera circuitry, interfaces, and the like (not shown) configured to provide a camera interface to a user of the camera body 1100. The camera body 1100 includes a cavity 1105, for instance on the front surface of the camera body 1100, configured to receive a multiple camera array module 1110 in any of a number of configurations.

Figure 11B:
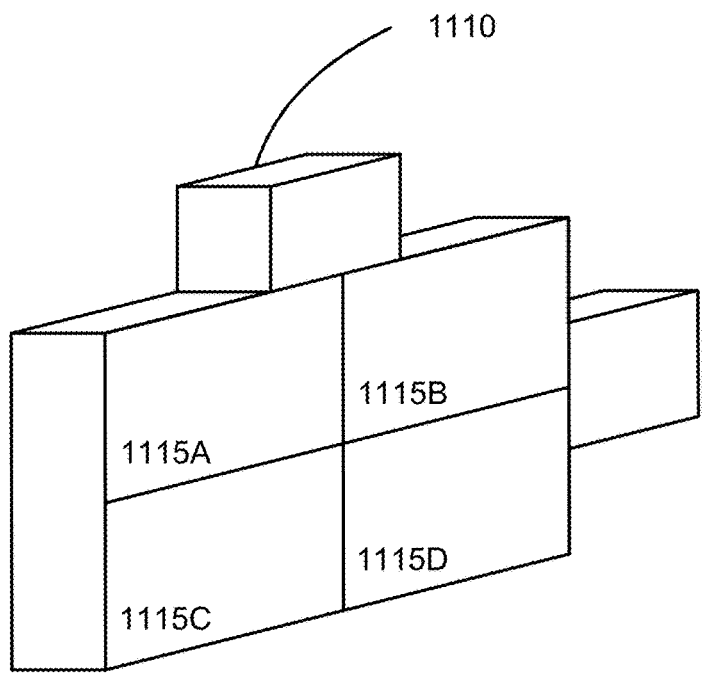
FIG. 11B illustrates a multiple camera array module for insertion within a camera body in a plurality of configurations, according to one embodiment.

FIG. 11B illustrates a multiple camera array module 1110 for insertion within a camera body 1100 in a plurality of configurations, according to one embodiment. The multiple camera array module 1110 (e.g., 2×2 camera array) includes 4 cameras 1115A-D coupled together to form a substantially rectangle shape, with two protrusions extending away from the camera array module 1110 along the midpoints of two adjacent sides of the multiple camera module 1110. In other embodiments, the camera array module 1110 can be in a substantially circular shape with similar protrusions. The cavity 1105 of the camera body 1100 can include reciprocal cavities arranged to accommodate the protrusions of the multiple camera array module 1110 in any number of configurations. In another embodiment, the camera array module 1110 can include flexible material where the protrusions are and the cavity 1105 of the camera body can include protrusions instead of reciprocal cavities. Thus, the protrusions of the cavity 1105 can snap into the flexible material present in the camera array module 1110.

In the embodiment of FIG. 11A, the cavity 1105 within the front face of the camera body 1100 can receive the multiple camera module 1110 in the position illustrated in FIG. 11B, and can further receive the multiple camera array module 1110 in a position rotated 90 degrees clockwise. Such a configuration beneficially allows a user to capture images in a first orientation of the camera body 1100, and to remove, rotate, and re-insert the multiple camera array module 1110 into the camera body 1100 in a second orientation. In an alternative embodiment, the camera body 1100 can be rotated while in the camera body 1100. For example, the cavity 1105 can include a reciprocal cavity path carved out inside the camera body 1100 along the edges of the cavity 1105. Then, when the camera array module 1110 is inserted in the cavity 1105, the camera array module 1110 can be rotated when the protrusions of the module 1110 align with the reciprocal cavity path inside the camera body 1100. Although a particular embodiment is illustrated in FIGS. 11A and 11B, in practice any configuration of camera body 1100 reciprocating cavity 1105 and multiple camera array module 1110 can be used according to the principles described herein.

Figure 12A:
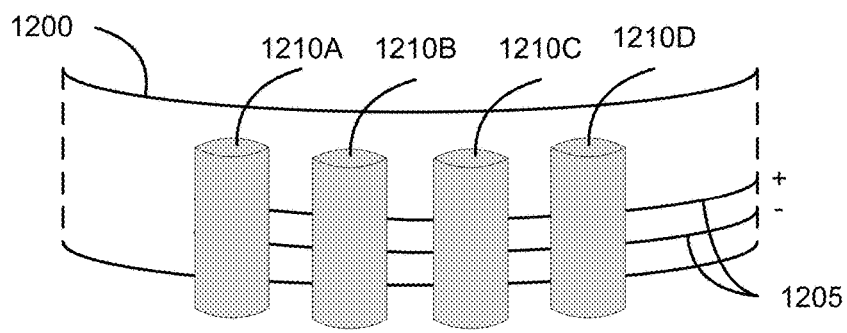
FIG. 12A illustrates a camera strap including a battery system and an associated electrical interface, according to one embodiment.

FIG. 12A illustrates a camera strap 1200 including a battery system and an associated electrical interface, according to one embodiment. In the embodiment of FIG. 12A, a camera strap 1200 includes one or more batteries (e.g., 1210A, 1210B, 1210C, and 1210D) electrically coupled to and configured to provide power to a camera system coupled to the strap by strap wiring 1205 within the strap 1200. For example, the camera strap 1200 can include battery interfaces 1215A, 1215B, and 1215C that can each receive a battery 1210 and electrically couple the battery 1210 with the other batteries 1200 through the wiring 1205, as shown in FIG. 12B.

Figure 12B:
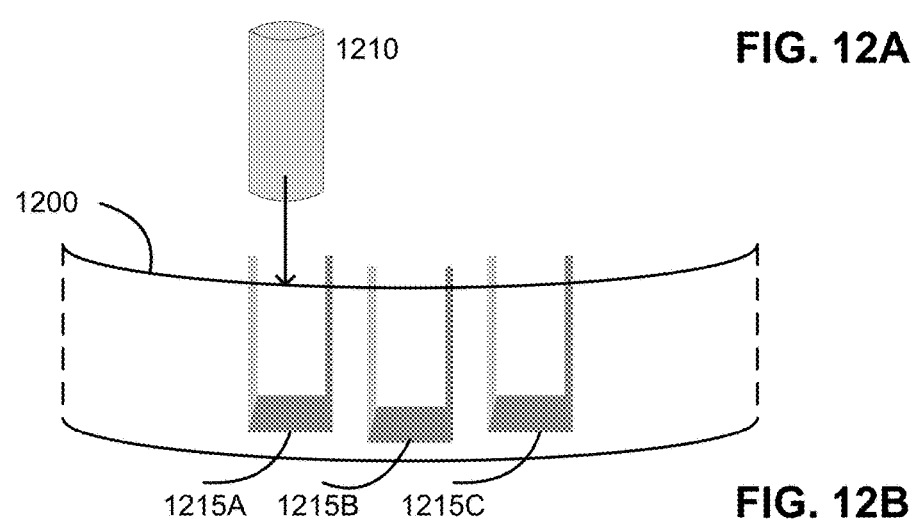
FIG. 12B illustrates a camera strap including a battery interface system, according to one embodiment.
Figure 12C:
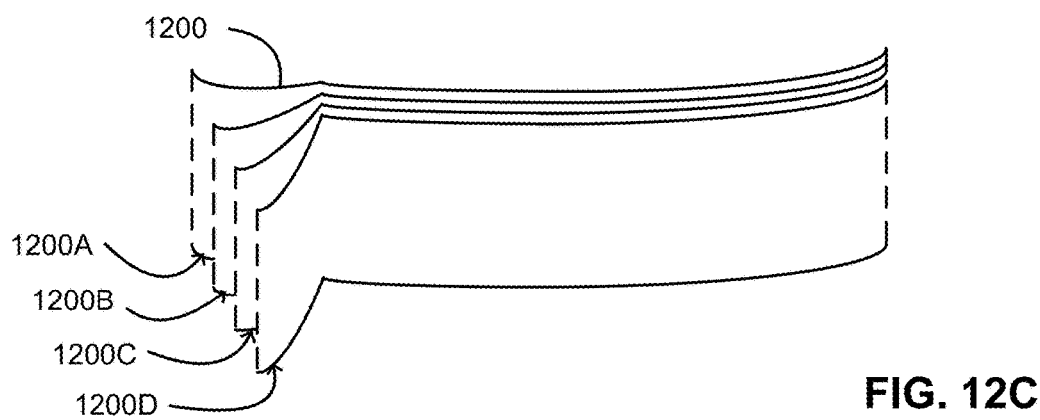
FIG. 12C illustrates the camera strap of FIG. 12A, according to one embodiment.

FIG. 12B illustrates the camera strap 1200 of FIG. 12A, according to one embodiment. The strap 1200 includes multiple layers: two outer protective layers 1200A and 1200D, a battery layer 1200B configured to provide power to a battery, and a circuit layer 1200C including one or more circuits (not shown) configured to perform various functions, such as a circuit configured to identify an amount of power stored by the battery, an amount of power available to the camera, and the like. The camera strap 1200 can be coupled to the camera array through a connection interface aligned with the wiring 1205 or with the battery interfaces

1215. In other words, the camera strap can secure a camera or a multiple camera array to a user, and the batteries 1210 can provide power to the secure camera or multiple camera array via the wiring 1205.

Figure 13:
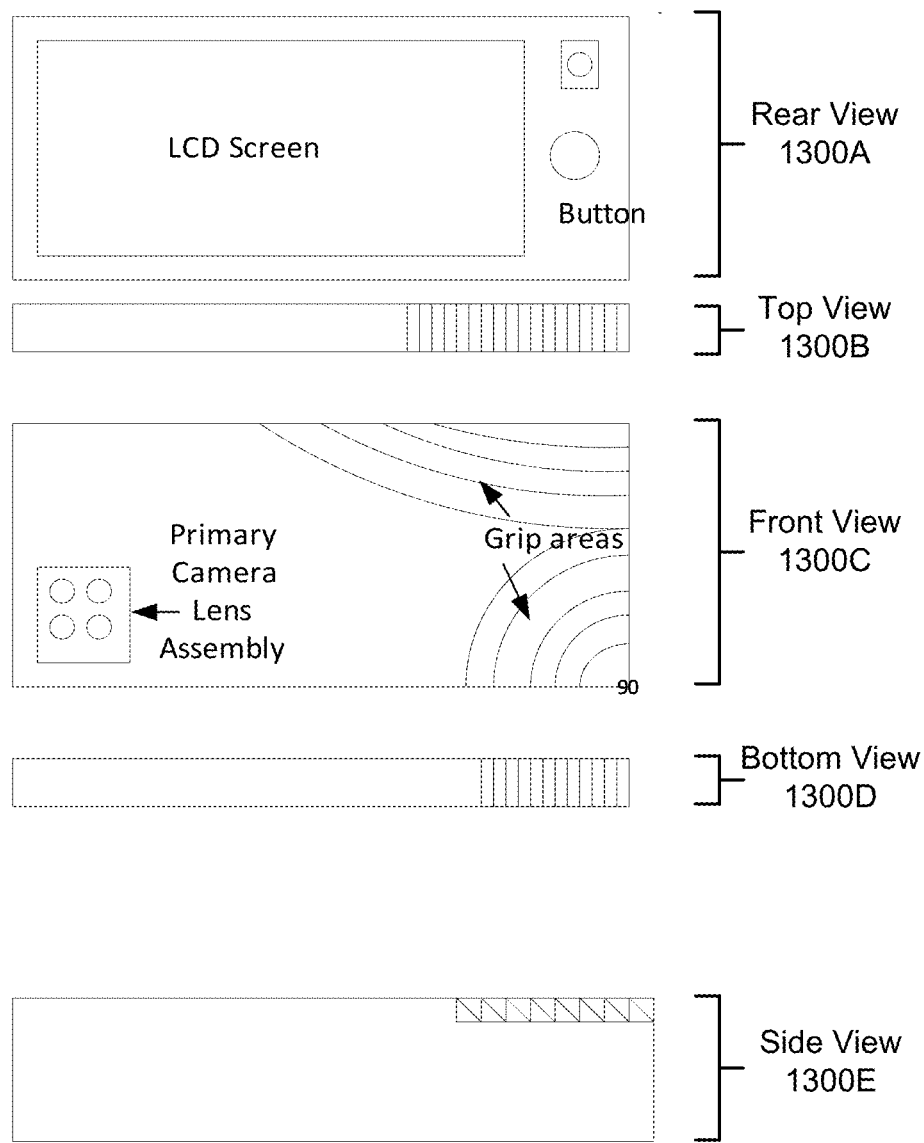
FIG. 13 illustrates a grip system for a camera system, according to one embodiment.

FIG. 13 illustrates a grip system for a camera system, according to one embodiment. The rear view 1300A of the camera system illustrates the rear of the camera. The top view 1300B illustrates a grip pattern on one side of the top of the camera system. The grip pattern illustrated within the embodiment of FIG. 13 includes asymmetrical sawtooth grip/friction protrusions angled in an obtuse relation to the body in the direction of anticipated grip slippage by a user of the camera system. The grip patterns can be less than 0.5 mm in depth, and within 0.25 mm apart in some embodiments. The front view 1300C illustrates two grip areas on one side of the front of the camera. Each grip area includes sawtooth protrusions angled in different directions, and extending various lengths across the front of the camera system. The different angles of the sawtooth protrusions account for different directions in expected grip slippage; for instance, the top grip area can be angled to accommodate grip slippage by a front of an index finger, and the bottom grip area can be angled to accommodate grip slippage by a side of a middle finger. The bottom view 1300D illustrates a grip pattern on one side of the bottom of the camera system, and the side view 1300E illustrates a grip pattern on one portion of the side of the camera system. The grip system illustrated in the embodiment of FIG. 13 beneficially increases the ability of a user to grip a camera, for instance in inclement conditions such as camera operation in cold and wet conditions. The position of the grip pattern on the camera system also beneficially guides a user's hand to a portion of the camera that does not interfere with camera buttons, interfaces, and the like, and does not obfuscate the camera lens.

Figure 14A:
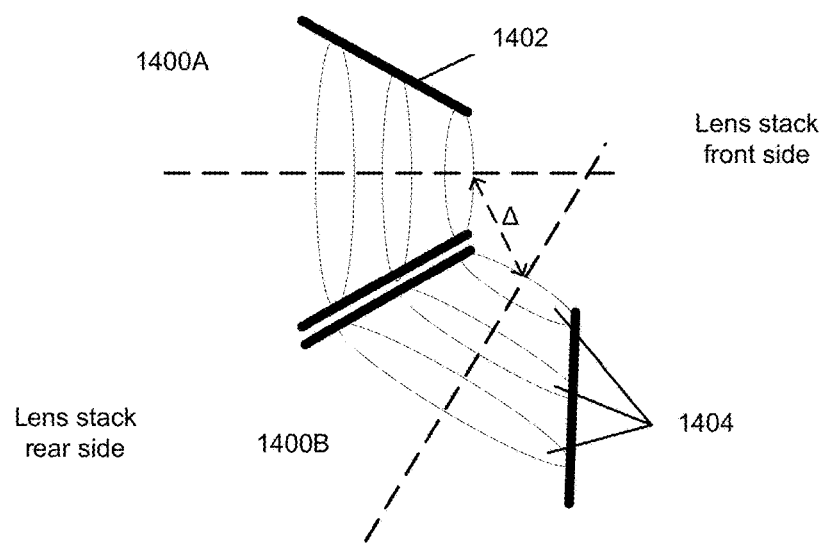
FIG. 14A illustrates adjacent lens stacks in a multiple camera array, according to one embodiment.

FIG. 14A illustrates adjacent lens stacks in a multiple camera array, according to one embodiment. Each lens stack, lens stack 1400A and lens stack 1400B, includes a stack housing 1402 containing one or more lenses 1404. Each stack housing 1402 is shaped such that walls or outer surfaces of the housing converge from the rear of each lens stack 1400 to the front. For example, the outer layer of the stack housing 1402 can be less than 5 mm from the inner components including the lenses 1404. Accordingly, the lenses 1404 in each lens stack 1400 have progressively smaller diameters from the rear of each lens stack 1400 to the front. Each lens 1404 in the embodiment of FIG. 14A can be a disc lens, a flat lens, or the like. It should be noted that although certain lenses are referred to herein as "disc lenses" or "flat lenses", it should be noted that in practice such lenses can have curved front and/or rear faces, but that the diameter of such lenses is generally larger than the front-to-rear thickness of such lenses. The parallax error between images caught using the lens stacks 1400A and 1400B is dependent on the distance Δ between the center of each forward-most lens of lens stack 1400A and 1400B. As the distance Δ decreases, the parallax error in images captured by the lens stacks 1400A and 1400B decreases.

Figure 14B:
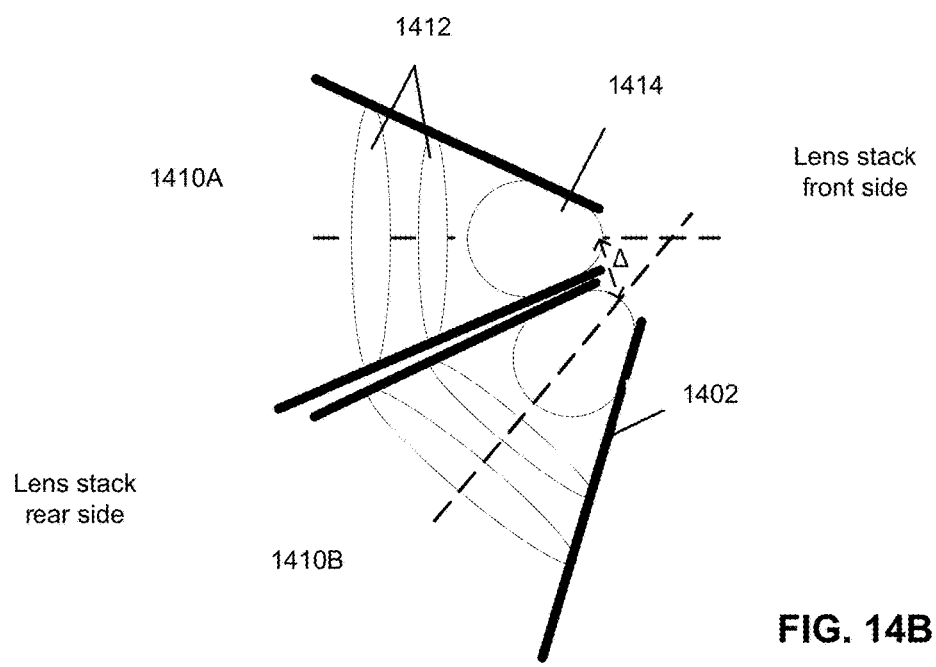
FIG. 14B illustrates adjacent lens stacks including cone lenses in a multiple camera array, according to one embodiment.

FIG. 14B illustrates adjacent lens stacks 1410 including cone lenses 1414 in a multiple camera array, according to one embodiment. Each lens stack 1410A and 1410B includes a plurality of lenses: one or more disc lenses 1412, and one forward-most cone lens 1414. As used herein, a cone lens 1414 refers to a lens with a circular cross-section and a variable diameter, such that a diameter of a cross-section at the rear of the cone lens 1414 (the side facing the rear side of the lens stack) is larger than a diameter of a cross-section at the front of the lens (the side facing the front side of the lens stack). It should be noted that although the cone lenses 1414 of FIG. 14B are shown with curved front and rear faces, in practice these faces may be flat, or may be curved to a much lesser extent than as shown in FIG. 14B.

The use of cone lenses 1414 as forward-most lenses in the lens stacks 1410 in the multiple camera array of FIG. 14B allows the housing 1402 of each lens stack 1410 to extend further forward in comparison to the lens stacks 1400 of FIG. 14A. This in turn reduces the distance Δ between the centers of the forward-most lenses, which in turn reduces the parallax error in images captured by the multiple camera array. It should be noted that although only two lens stacks 1410 are illustrated in the embodiment of FIG. 14B, in practice, multiple camera arrays can include any number of lens stacks, each including a cone lens as the forward-most lens within the lens stack.

It should be noted that the multiple camera arrays described herein can be configured to couple to and act as a remote control for any device configured to wirelessly communicate with the multiple camera array device. For instance, the multiple camera array can be configured to act as a remote control for another camera, a music/video playback device, a storage device, a wireless communication device, a telemetry monitoring device, a calendar control or display device, a slideshow control device, or any other wireless device.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    capturing a plurality of images with each camera in a camera array comprising a plurality of cameras, each image comprising at least one portion overlapping with a corresponding portion of a corresponding image;
    aligning overlapping portions of corresponding images to produce a set of aligned images;
    for each aligned image, performing a warp operation on the aligned image to produce a warped image, wherein a magnitude of the warp operation on a portion of the aligned image increases with an increase in distance from the portion of the aligned image to the nearest overlapping portion of the aligned image;
    taping each warped image together based on the overlapping portions of the warped images to form a combined image; and
    cropping the combined image to produce a rectangular final image.

2. The method of claim 1, wherein the plurality of images is captured synchronously.

3. The method of claim 1, wherein the warp operation comprises a plurality of local warps performed on portions of each aligned image.

4. The method of claim 1, wherein a center of the warp operation performed on an aligned image is based on an overlapping portion of the image.

5. The method of claim 1, wherein aligning overlapping portions of corresponding images comprises aligning an object of interest within overlapping portions of the corresponding images.

6. The method of claim 1, wherein the warp operation is performed on the entire aligned image.

7. The method of claim 1, wherein the warp operation is performed on a subset of the aligned image.

8. The method of claim 1, wherein the warp operation maps the aligned image to a rectilinear matrix.

9. The method of claim 1, wherein the warp operation removes distortion in the aligned image.

10. The method of claim 1, wherein cropping the combined image comprises removing portions of the image that extend past a largest rectangular that can be fully contained within the combined image.

11. A system comprising at least one processor and a non-transitory computer readable medium comprising instructions configured to, when executed by one or more hardware processors, perform steps comprising:
    capturing a plurality of images with each camera in a camera array comprising a plurality of cameras, each image comprising at least one portion overlapping with a corresponding portion of a corresponding image;
    aligning overlapping portions of corresponding images to produce a set of aligned images;
    for each aligned image, performing a warp operation on the aligned image to produce a warped image, wherein a magnitude of the warp operation on a portion of the aligned image increases with an increase in distance from the portion of the aligned image to the nearest overlapping portion of the aligned image;
    taping each warped image together based on the overlapping portions of the warped images to form a combined image; and
    cropping the combined image to produce a rectangular final image.

12. The system of claim 11, wherein the plurality of images is captured synchronously.

13. The system of claim 11, wherein the warp operation comprises a plurality of local warps performed on portions of each aligned image.

14. The system of claim 11, wherein a center of the warp operation performed on an aligned image is based on an overlapping portion of the image.

15. The system of claim 11, wherein aligning overlapping portions of corresponding images comprises aligning an object of interest within overlapping portions of the corresponding images.

16. The system of claim 11, wherein the warp operation is performed on the entire aligned image.

17. The system of claim 11, wherein the warp operation is performed on a subset of the aligned image.

18. The system of claim 11, wherein the warp operation maps the aligned image to a rectilinear matrix.

19. The system of claim 11, wherein the warp operation removes distortion in the aligned image.

20. The system of claim 11, wherein cropping the combined image comprises removing portions of the image that extend past a largest rectangular that can be fully contained within the combined image.

* * * * *